(12) United States Patent
Takahashi

(10) Patent No.: US 7,053,865 B2
(45) Date of Patent: May 30, 2006

(54) 3-D DISPLAY DEVICE

(75) Inventor: Susumu Takahashi, Iruma (JP)

(73) Assignee: Olympus Corporation, Tokyo (JP)

( * ) Notice: Subject to any disclaimer, the term of this patent is extended or adjusted under 35 U.S.C. 154(b) by 656 days.

(21) Appl. No.: 09/867,685

(22) Filed: May 31, 2001

(65) Prior Publication Data

US 2002/0180659 A1 Dec. 5, 2002

(51) Int. Cl.
*G09G 5/00* (2006.01)

(52) U.S. Cl. .......................... 345/7; 359/462

(58) Field of Classification Search .................. 345/1, 345/6, 7, 8, 9, 166, 419, 653; 359/12, 13, 359/376, 458, 462, 463, 464, 465; 349/11, 349/15; 348/50, 51, 52, 53–54, 55–60; 353/7–9
See application file for complete search history.

(56) References Cited

U.S. PATENT DOCUMENTS

| | | | | |
|---|---|---|---|---|
| 3,829,202 A | * | 8/1974 | Liddell | 352/62 |
| 4,172,632 A | * | 10/1979 | Holmes, Jr. | 359/465 |
| 4,719,507 A | * | 1/1988 | Bos | 348/57 |
| 5,311,220 A | | 5/1994 | Eichenlaub | |
| 5,475,419 A | * | 12/1995 | Carbery | 348/59 |
| 6,040,945 A | * | 3/2000 | Karasawa | 359/630 |
| 6,082,862 A | | 7/2000 | Popovich | |
| 6,095,652 A | | 8/2000 | Trayner et al. | |
| 6,101,008 A | | 8/2000 | Popovich | |
| 6,124,954 A | | 9/2000 | Popovich et al. | |
| 6,219,182 B1 | * | 4/2001 | McKinley | 359/407 |
| 6,219,186 B1 | * | 4/2001 | Hebert | 359/618 |
| 6,252,707 B1 | * | 6/2001 | Kleinberger et al. | 359/465 |
| 6,407,724 B1 | * | 6/2002 | Waldern et al. | 345/8 |
| 6,646,805 B1 | * | 11/2003 | Mitamura et al. | 359/578 |
| 6,710,920 B1 | * | 3/2004 | Mashitani et al. | 359/463 |
| 2002/0113866 A1 | * | 8/2002 | Taniguchi et al. | 348/51 |
| 2003/0067539 A1 | * | 4/2003 | Doerfel et al. | 348/51 |

FOREIGN PATENT DOCUMENTS

| | | |
|---|---|---|
| JP | H8-190056 | 7/1996 |
| JP | H10-020198 | 1/1998 |
| JP | 2000-267045 | 9/2000 |
| JP | 2000-281628 | 10/2000 |
| JP | 2000-338412 | 12/2000 |
| JP | 2001-42260 | 2/2001 |

* cited by examiner

*Primary Examiner*—Vijay Shankar
*Assistant Examiner*—Nitin Patel
(74) *Attorney, Agent, or Firm*—Arnold International; Bruce Y. Arnold

(57) ABSTRACT

Various embodiments of a 3-D display device are disclosed which simultaneously provide a wide field of view and a large eye relief and yet do not require that the viewer wear glasses or the like in order to keep the images intended for only the left eye from entering the view field of the right eye and vice-versa. The light that forms left and right display images is made independent in left and right optical paths, either by having orthogonal polarizations, wavelengths that do not overlap, or by time-multiplexing the left and right images in different time periods that do not coincide.

32 Claims, 19 Drawing Sheets

3-D DISPLAY DEVICE

CROSS-REFERENCE TO RELATED APPLICATION

This application is related in subject matter to that of commonly assigned U.S. application Ser. No. 09/686,976 entitled "3-D Viewing System", filed Oct. 12, 2000, the disclosure of which is hereby incorporated by reference.

BACKGROUND OF THE INVENTION

What is termed "3-D observation" is achieved by displaying left and right images (i.e. images having different parallax) to only the left eye and right eye, respectively, of a viewer. Usually, this requires that the viewer wear glasses or the like in order for the left eye to see only images intended for the left eye, and for the right eye to see only images intended for the right eye. However, the wearing of glasses and the like to achieve 3-D viewing effects is troublesome. There do exist prior art 3-D display devices that do not require the viewer to wear glasses in order to keep the images intended for the left eye from being visible to the right eye, and vice-versa. However, in these prior art 3-D display devices, a wide field angle and large eye relief cannot be achieved simultaneously, due to physical interference between the left and right optical systems and the left and right optical elements.

Electronic image display devices include face mounted displays (FMD's), head mounted displays (HMD's) and television monitors. Small electronic image display viewing devices, such as currently developed FMD's and HMD'S, can provide a viewer's left and right eye with separate images having different parallax using left and right optical viewing systems, respectively, that are placed very near the eyes.

Recently, an improved display structure has been developed. Japanese Patent Publication No. 2000-338412 ensures a maximum effective aperture for an optical system by bonding left and right optical magnifying systems to a display surface. The left and right images are prevented from entering the right and left eye, respectively, by reason of the exit pupils of the left and right optical magnifying systems being separated. However, even with this improvement, a wide field angle and a large eye relief are not simultaneously achieved.

Another conventional solution uses a monitor. Left and right images are displayed alternately on the monitor and means are provided to separately convey these images to the respective intended eyes of the viewer. There also are other means that are used for selectively displaying images with different parallax to the left and right eyes, respectively, so as to achieve a 3-D observation. Typically, the viewer wears glasses having a shutter mechanism for switching between the left and right eyes. The shutter mechanism is synchronously timed to the left and right images that are displayed, so that the left eye receives only the left images and the right eye receives only the right images. However, this also requires the viewer to wear glasses. Further, the viewer should be some distance from the display device in order for it to be comfortable to view, resulting in a larger display device.

Further, Japanese Patent Publication No. 2000-267045 provides a structure for displaying 3-D images that does not require the user to wear glasses. The display device includes an optical system in which left and right images independently reach the left and right eyes, respectively. However, a lens surface is required to be located at the screen for projecting the images. Yet, no other optical system is required between the screen and the viewer's eyes. The viewer's eyes should be at least 300 mm, and preferably 1000 mm, away from the display device for comfortable observation, resulting in a large device.

BRIEF SUMMARY OF THE INVENTION

The object of the present invention is to realize a small-sized electronic image display viewing device which allows a 3-D display to achieve: (1) a wide field angle (2) a large eye relief, so that the display is comfortable to view, and (3) 3-D observation without requiring that the viewer wear glasses.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
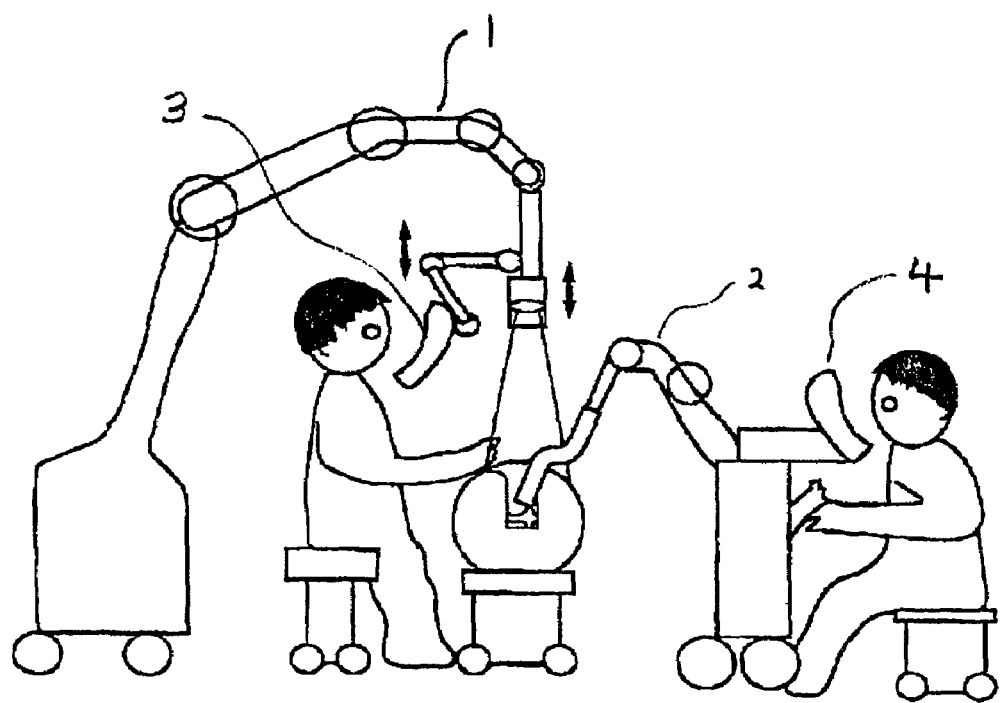
FIG. 1 shows a surgical microscope and a 3-D endoscope being used during a surgical procedure.

As shown in FIG. 1, image input devices may include a surgical microscope 1, a 3-D endoscope 2, or a conventional-type of 3-D image forming device as described in Japanese Patent Publication 2000-338412 (not shown in FIG. 1).

As will be discussed in detail below, the present invention includes left and right optical systems for independently forming respective left and right images having different optical properties (e.g., orthogonal polarizations) wherein the left and right images are at least partially overlapped, in order to provide a wide field of view and a large eye relief.

In addition, in order to avoid physical interference among components, when one display element is used, the left and right images are displayed on the display element in different regions that at least partially overlap. When two display elements are used, the left and right axes of the optical system are aligned so as to be parallel, but are offset with respect to each other.

The present invention may also include an ocular having an optical axis that is shared by the left and the right viewing systems, and an optical relay system which forms an intermediate image before the ocular. In this case, the left and right eyes and the left and right images have the following relationship so that the pupils for the left and right images at the intermediate image are spaced apart and so that the proper images are directed to each pupil:

(a) the left and right images, respectively, are displayed as intermediate images alternately (i.e., in a time-division manner). Synchronously, the projected light is switched between the left and right optical paths using lens systems having different optical axes; or (b) the left and right images are displayed as intermediate images alternately (i.e., in a time-division manner). Synchronously, the projected light is switched between the left and right optical paths by switching the polarization of the projected light; or (c) an optical pupil composition system and an optical system that includes a display element are used for projecting intermediate images, and the left and right images are separated into the left and right optical paths using the difference in the position of the pupils (that is to say, the different locations of pupils enable the division between the left and right optical paths).

The display device according to the present invention may be used as the display device 3 for the surgical microscope 1. The surgical microscope includes an optical image input portion for acquiring images having different parallax of a surgical site. The surgical microscope also includes a display portion for displaying these images as 3-D images to a viewer. The image display of the present invention has the form of goggles. The viewer can observe 3-D images simply by placing his eyes at the observation points (i.e., the exit pupils of the goggles) without actually having to wear the goggles. The optical image input part and the display part are electrically connected so that each of their positions can be changed independently. Therefore, the viewer can move the display device (i.e., the goggles) in order to provide a comfortable viewing posture.

The display device according to the present invention can also be used as a display device 4 for a 3-D endoscope 2. The 3-D endoscope has an optical image input part for acquiring 3-D images having different parallax. In this case, the display device is provided in order to allow the observer to control a device which is connected to the 3-D endoscope. The viewer can observe 3-D images simply by placing his eyes at the observation points (i.e., the exit pupils).

Figure 2:
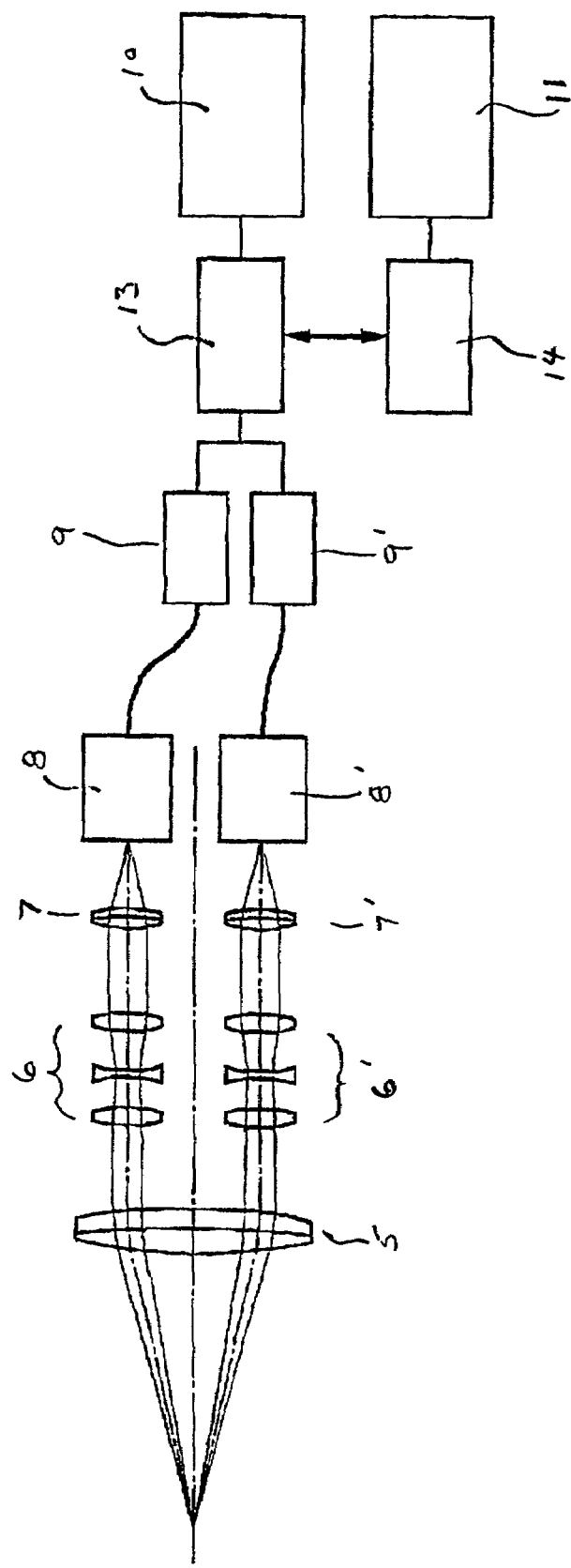
FIG. 2 shows the optical system of the surgical microscope illustrated in FIG. 1, including elements of a 3-D display system.

The optical system of the surgical microscope, which also provides 3-D images to a viewer, is shown in FIG. 2. As shown in this figure, the optical system includes, in order from the object side, an objective lens 5, afocal optical zoom systems 6, 6', imaging lenses 7, 7', and cameras 8, 8'. The objective lens 5 changes the light flux from the object into collimated light. The afocal zoom systems change the magnification of different parallax portions of the collimated light from an object. Each imaging lens 7, 7' forms images at respective image planes, which images are recorded by the respective cameras 8, 8'. With this configuration, images with different parallax, such as left and right images, can be obtained. Images which are output from the cameras 8, 8' are fed to the camera control units 9, 9'. A switching device 13 is used to display the images on one and the same display panel 10. The switching device 13 and a driving part 14 of a polarization direction control element 11 are synchronized. The polarization direction is in this way switched synchronously with the switching of left and right images in order to display left and right images using linearly polarized components which are orthogonal to each other.

Various embodiments of the invention will now be described in detail with reference to the drawings. Unless noted as being different below, elements denoted in the various figures with the same numerals are identical in construction.

EMBODIMENT 1

Figure 3:
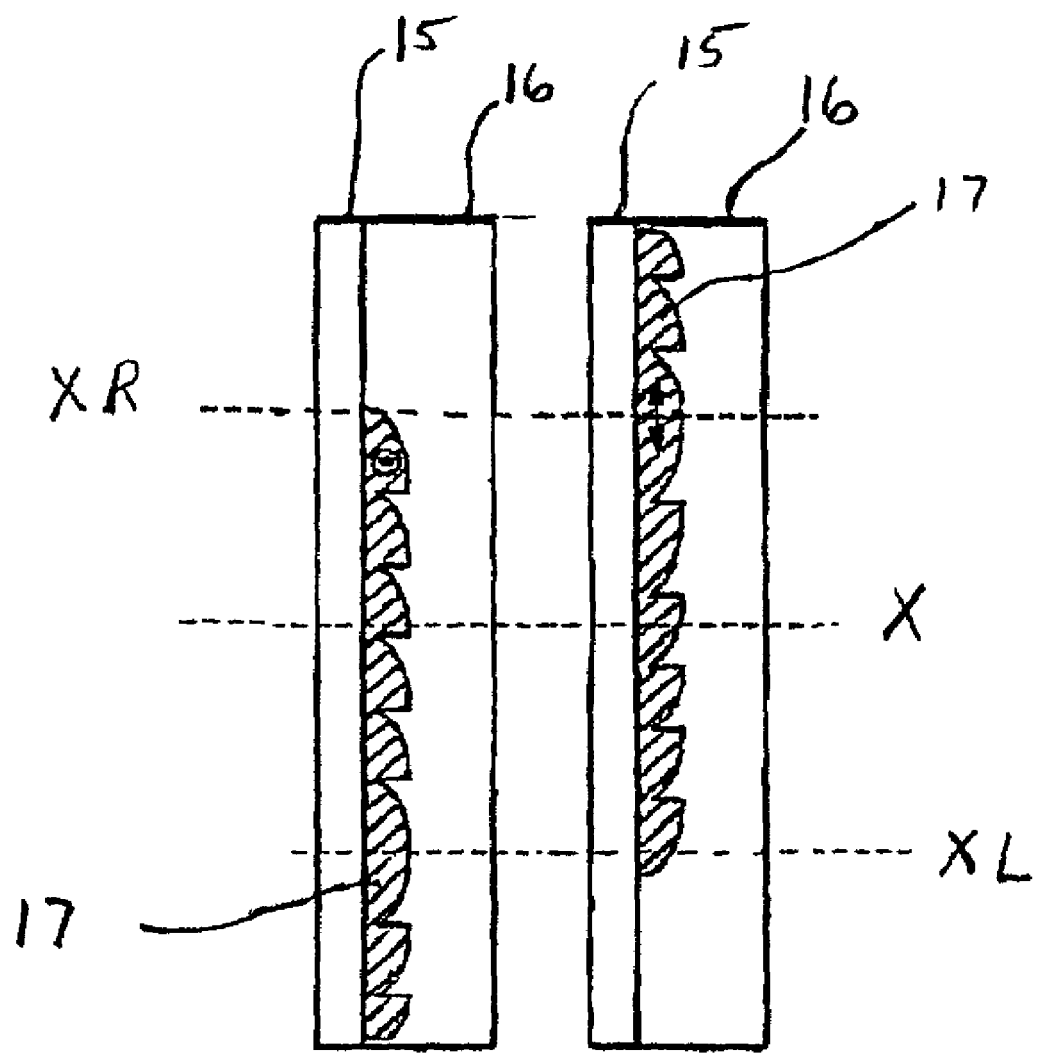
FIG. 3 shows the configuration of components of left and right optical path systems of Embodiment 1 as well as of some other embodiments.
Figure 4:
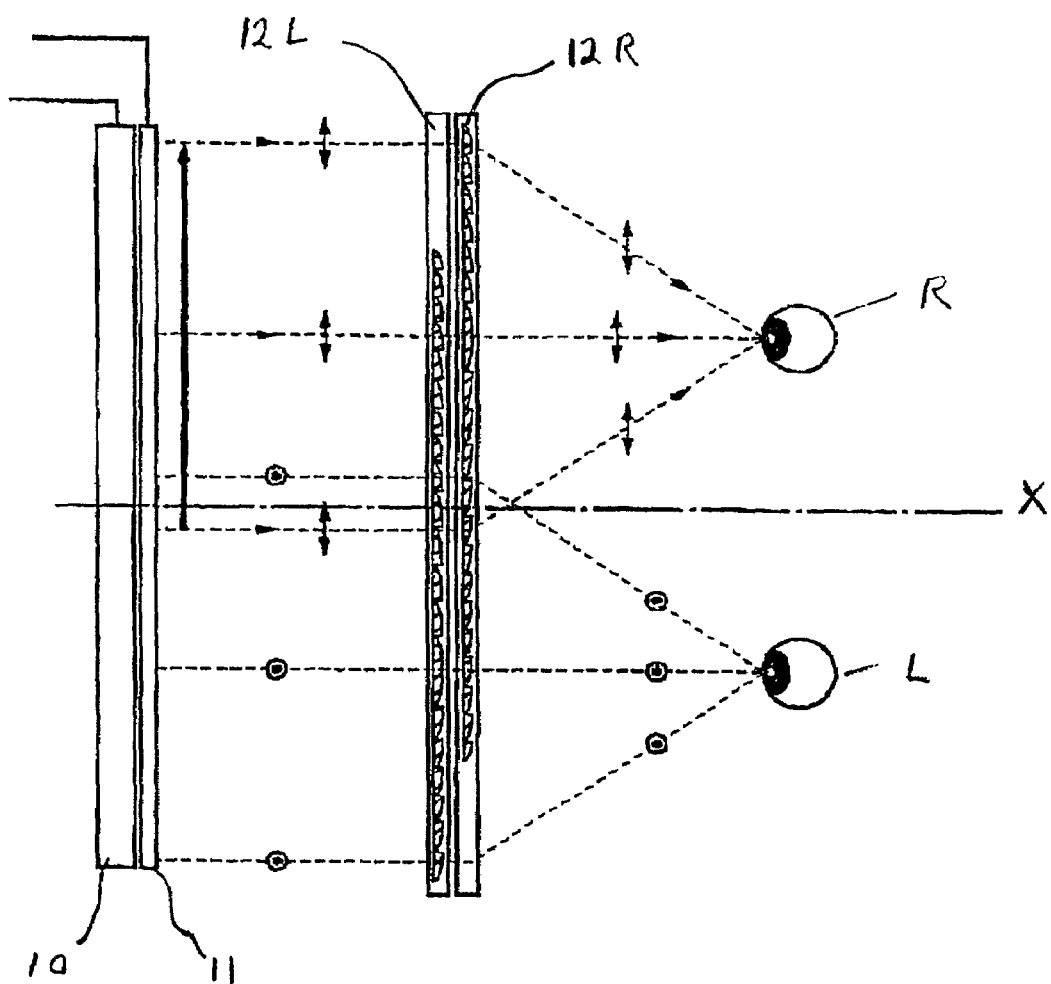
FIG. 4 shows the entire display device according to Embodiment 1.

FIG. 3 shows the configuration of components of the left and right optical path systems of Embodiment 1, and FIG. 4 shows the configuration of the left and right optical path systems 12L, 12R of the display device of this embodiment, as well as a viewer's left and right eyes L, R viewing the display device.

Referring first to FIG. 4, this display device is formed of a display panel 10, a polarization direction control element 11 (which changes the polarization direction, alternately, in order to sequentially display left and right images), and left and right optical systems for respective left and right optical paths 12L and 12R. The left and right images are thus displayed on the display panel alternately in a time-division manner.

Figure 5A:
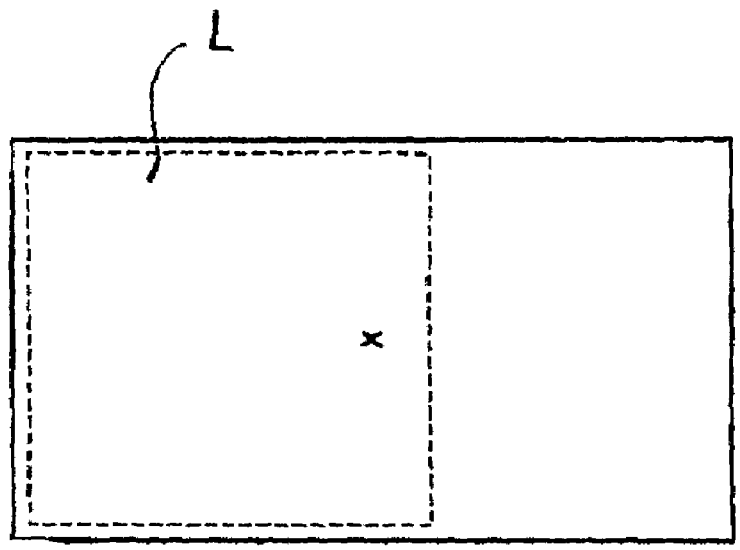
FIGS. 5A and 5B illustrate left and right images, respectively, being alternately displayed on a single display panel (i.e., in a time-division manner)
Figure 5B:
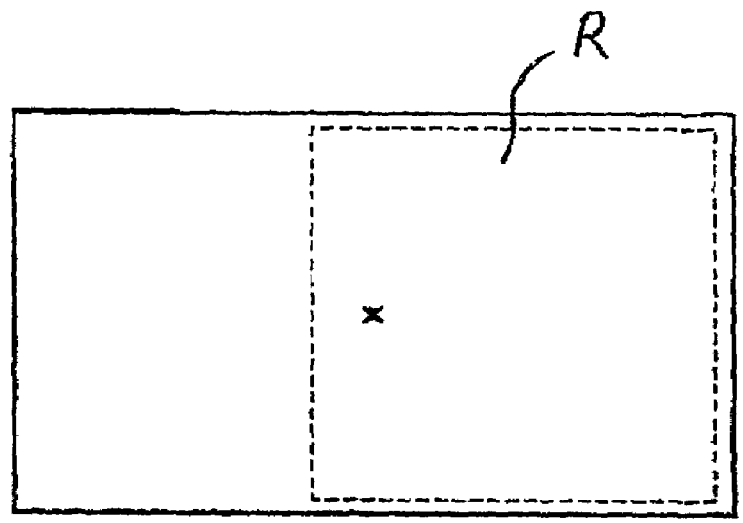

FIGS. 5A and 5B show the manner in which these images are displayed. As can be seen, the two images are displayed on left and right portions of the display panel, alternately, so that the two images overlap in space, but not in time, in a region that includes a central axis X. Thus, the display panel combined with the polarization direction control element displays wide-angle, left and right images, with a large eye relief. Although not apparent to the observer, each image is formed of linearly polarized light, with the two images being polarized in orthogonal directions.

As is well-known by those of ordinary skill in the art, this can be achieved in many ways. In Embodiment 1, the display panel 10 itself emits polarized light (e.g., a liquid crystal panel), and the polarization direction control element 11 is a polarization direction rotating element that includes a liquid crystal. When a luminescent panel that emits non-polarized light is used for the display panel 10, orthogonal polarization components can be selectively controlled.

A block diagram is shown in FIG. 2, where image signals for left and right images are switched alternately by a switching device 13 to display them on one and the same display panel 10. (Note that the polarization direction control element 11 of FIG. 2 is actually positioned, as shown in FIG. 4, in front of the display panel 10). The switching device 13 and the driving part 14 of the polarization direction control element are synchronized. The polarization direction is switched synchronously with the switching of left and right images to display the left and right images using linearly polarized components which are orthogonal to each other.

As shown in FIG. 4, the optical axes of the left and right optical path systems 12L and 12R are both offset (i.e., de-centered) relative to the centerline X of the display panel 10. The left image is displayed on the display panel on the optical axis of the left optical path system and the right image is displayed on the display panel on the optical axis of the right optical path system. The left and right optical systems independently form images having polarized components which are orthogonal to each other. Therefore, by undergoing an imaging effect created by the left optical path system, and by not undergoing an imaging effect due to the right optical path system, the image containing parallax components as viewed by the left eye is formed on the optical axis of the left optical path system. Similarly, the image intended for the right eye is formed on the optical axis of the right optical path system. The vertical arrows and the circles with a central dot indicate the polarization direction of the electric component of light wave, as is standard notation. (The circle with a central dot indicates that the electric vector is vibrating normal to the plane of the paper).

Because the left and right images are displayed on one and the same display device in a time-division manner, these images may overlap. Further, there is no physical interference between the left and right image display elements.

In Embodiment 1, the left and right optical paths can be overlapped so as to simultaneously achieve a wide field of view and a large eye relief. Further, aberrations in the left and right optical path systems can be independently corrected, thereby facilitating favorable correction of aberrations and enabling images of high quality to be formed by the display.

FIG. 3 shows the configuration of the left and right optical path systems that are offset in Embodiment 1. The left and right optical path systems have similar configurations, but behave differently due to the polarization being different in the two paths. Each optical path system is formed of a set of abutting transparent plates that are attached to one another. Each set is formed of an orientation board 15 which abuts a transparent plate 16 having a Fresnel lens cut or etched into its surface. The Fresnel lens of one set is offset from the Fresnel lens of another set, and a polymer liquid crystal 17 that is birefringent (i.e., double-refracting, depending on the polarization of the input light) is confined in the space between the abutting surfaces. The polymer liquid crystal is formed of liquid crystal molecules which align themselves in a direction defined by the orientation board 15. After initial alignment by the orientation board 15, the orientation of the liquid crystal molecules is fixed by polymerization (that is to say, the orientation is fixed by then exposing the liquid crystal molecules to light).

As is shown in Example 7 of Japanese Patent Publication No. 2000-281628, the index of refraction for the ordinary ray Ne equals 1.508 and the index of refraction for the extraordinary ray Ne equals 1.711. Thus, a difference in refractive index of approximately 0.203 is obtained. The liquid crystal, after polymerization, is oriented orthogonal to the optical axis of the lens. Thus, linearly polarized light having an electric field that vibrates in parallel with the optical crystal axis of the liquid crystal is subject to an imaging effect due to the difference in refractive indexes, while light polarized orthogonal with the optical axis of the liquid crystal is not subject to any imaging effect, there being no change in the refractive index for such light.

Thus, optical systems having optical lens axes which are independent are realized in the left and right optical paths by using, in the left and right light paths, crystal axes which are orthogonal to each other. For instance, when the eye relief is 50 mm, the field angle is 60 degrees, and the interpupillary distance is 55 mm, the left and right light fluxes are overlapped 5 mm and the left and right images are also overlapped on the display panel. This enable a larger field angle and/or a larger eye relief than if such overlapping did not occur.

EMBODIMENT 2

Figure 6:
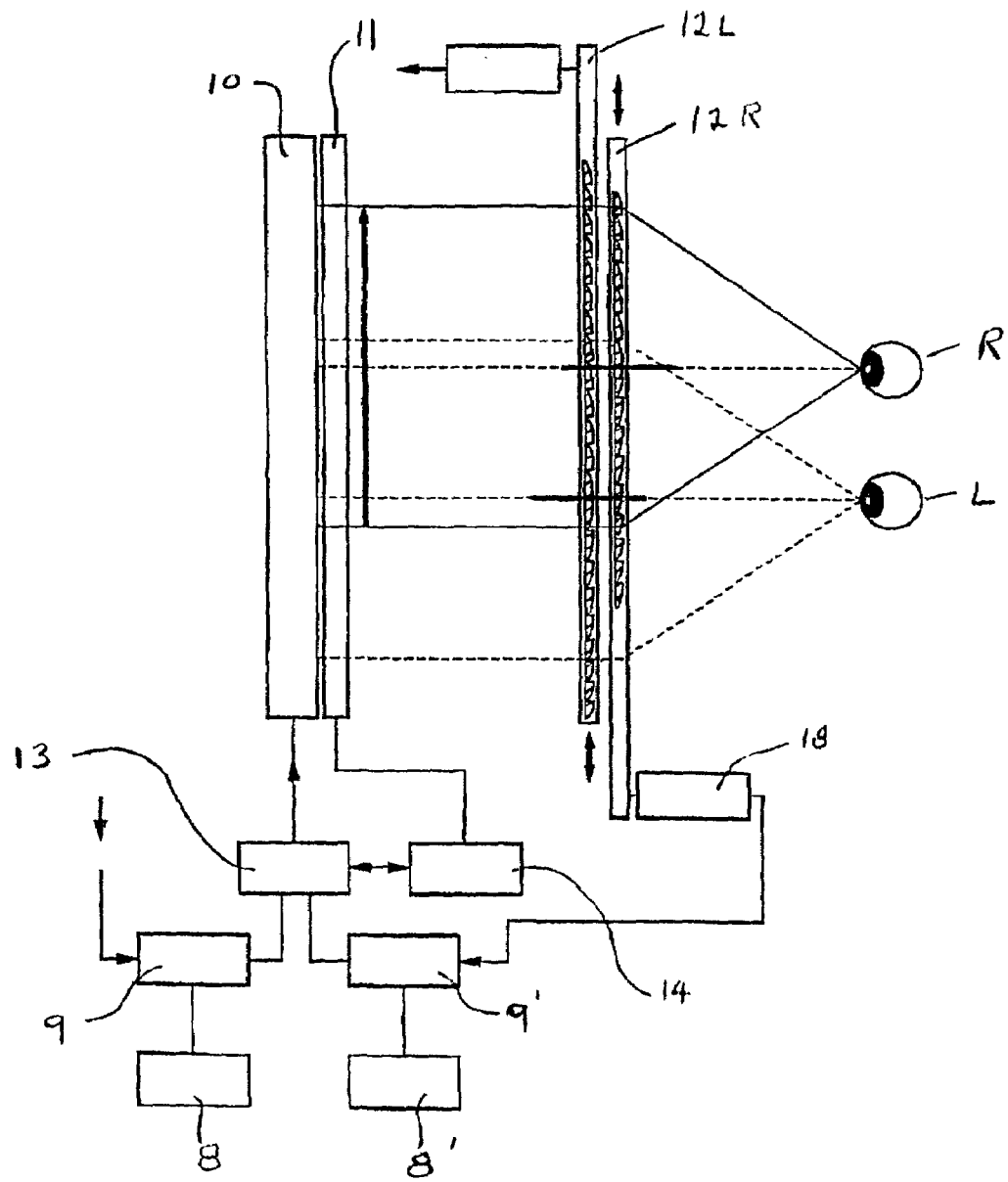
FIG. 6 shows the entire 3-D display system according to Embodiment 2.

FIG. 6 shows the entire configuration of the display device of Embodiment 2. This embodiment has the same characteristics as Embodiment 1 except that there is an interpupillary distance adjustment mechanism as well as a mechanism to change the distance between the left and right displayed images.

The interpupillary distance adjustment mechanism is formed by an optical viewing system having left and right optical axes, the distance between which is variable and may be adjusted by the viewer. In this embodiment a sensor 18 is provided for measuring the interpupillary distance selected by the user, and the distance between the left and right images on the display panel 10 is automatically adjusted to correspond to the interpupillary distance. Camera control parts 9, 9' receive a signal for changing the display timing to change the display distance between the left and right images on the display panel 10 according to a signal from the sensor 18. For adjusting the interpupillary distance, the viewer changes the distance between the left and right optical axes to move them for easier observation. Synchronously with this, the left and right displayed images move on the display panel. This allows the viewer to adjust the interpupillary distance without an uncomfortable feeling. For the interpupillary distance adjustment, the present invention uses optical systems the optical axes of which are placed directly in front of each eye so that high quality images can be easily provided in terms of aberration correction.

Although a mechanism for automatically adjusting the distance between the left and right images on the display panel 10 is not illustrated for this embodiment, an independent mechanism for changing the distance between the left and right displayed images on the display panel may be provided, such as using a servo-motor or mechanical adjustment means, so as to reduce the distance between the left and right displayed images.

EMBODIMENT 3

Figure 7:
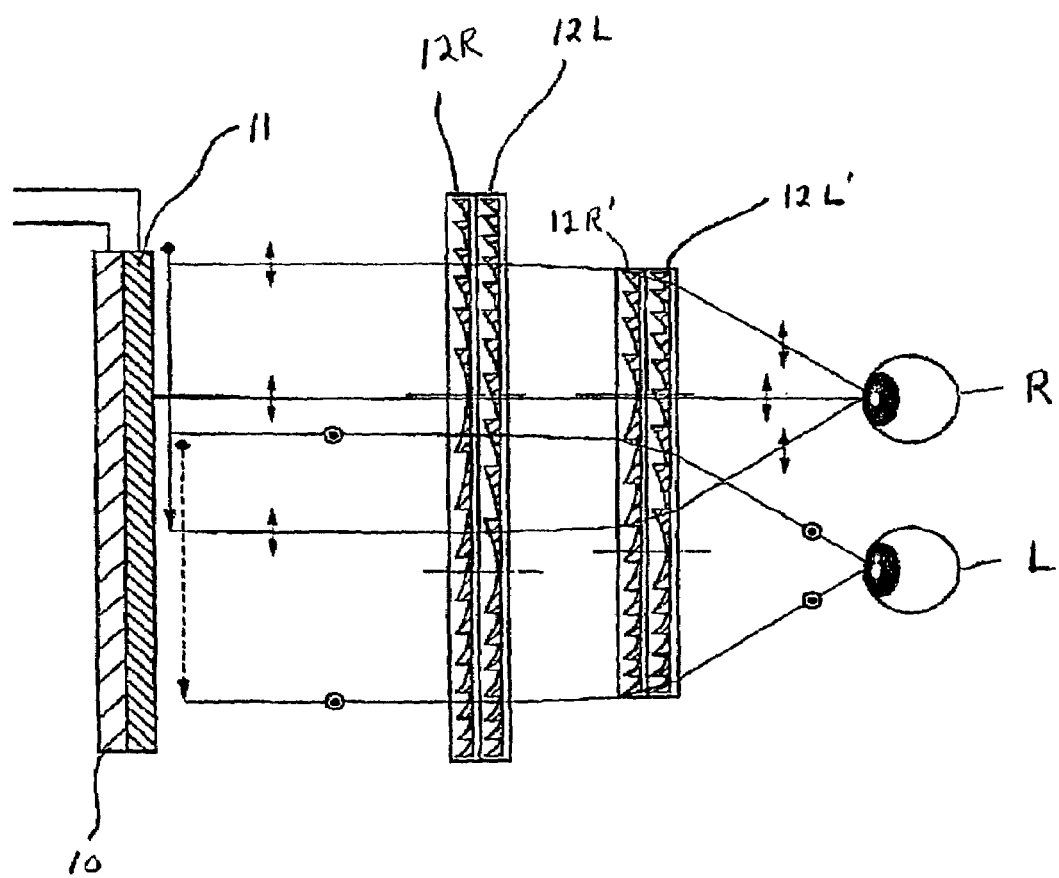
FIG. 7 shows the entire 3-D display device according to Embodiment 3.

FIG. 7 shows Embodiment 3 in which plural sets of optical systems having independent optical axes are arranged in the light path between a display and a viewer. Embodiment 3 has the same basic configuration as Embodiment 1, with only the differences being described hereinafter.

In this embodiment more than one optical system is placed in each of the left and right optical axis. For example, when the eye relief is 50 mm, the field angle is 60 degrees, and the interpupillary distance is 55 mm, the left and right light fluxes are overlapped 5 mm. For ensuring a 50 mm eye relief, the focal length of the optical system has to be approximately 50 mm. Thus, in order to ensure sufficient power of the optical system for the purpose of downsizing by using a shorter focal length, more than one optical system is placed on the left and right optical axes in order to shorten the focal length. Thus, a first right optical path system 12R and a second right optical path system 12R' are placed on the optical path that is viewed by the right eye R. Also, a first left optical path system 12L and a second left optical path system 12L' are placed in a different optical path that is viewed by the left eye L. The first left optical path system 12L and the first right optical path system 12R have different optical axes, which correspond to left and right displayed images, respectively. The right displayed image undergoes refraction by the first and second right optical path systems, and does not undergo refraction by the first and second left optical path systems, and is then viewed by the right eye. The left displayed image undergoes refraction by the first and second left optical path systems, and does not undergo refraction by the first and second right optical path systems, and is then viewed by the left eye.

This embodiment uses a liquid crystal element applied to the display panels in place of polymer liquid crystal as in Embodiment 1. The refractive index for the ordinary ray No is 1.524 and for the extraordinary ray Ne is 1.760. This embodiment uses a liquid crystal having a fixed orientation. Therefore, a liquid crystal driving circuit is not necessary. Polymer liquid crystal can also be used. The display panel has a horizontally long rectangular shape and the lenses have effective apertures that are rectangular.

EMBODIMENT 4

Figure 8:
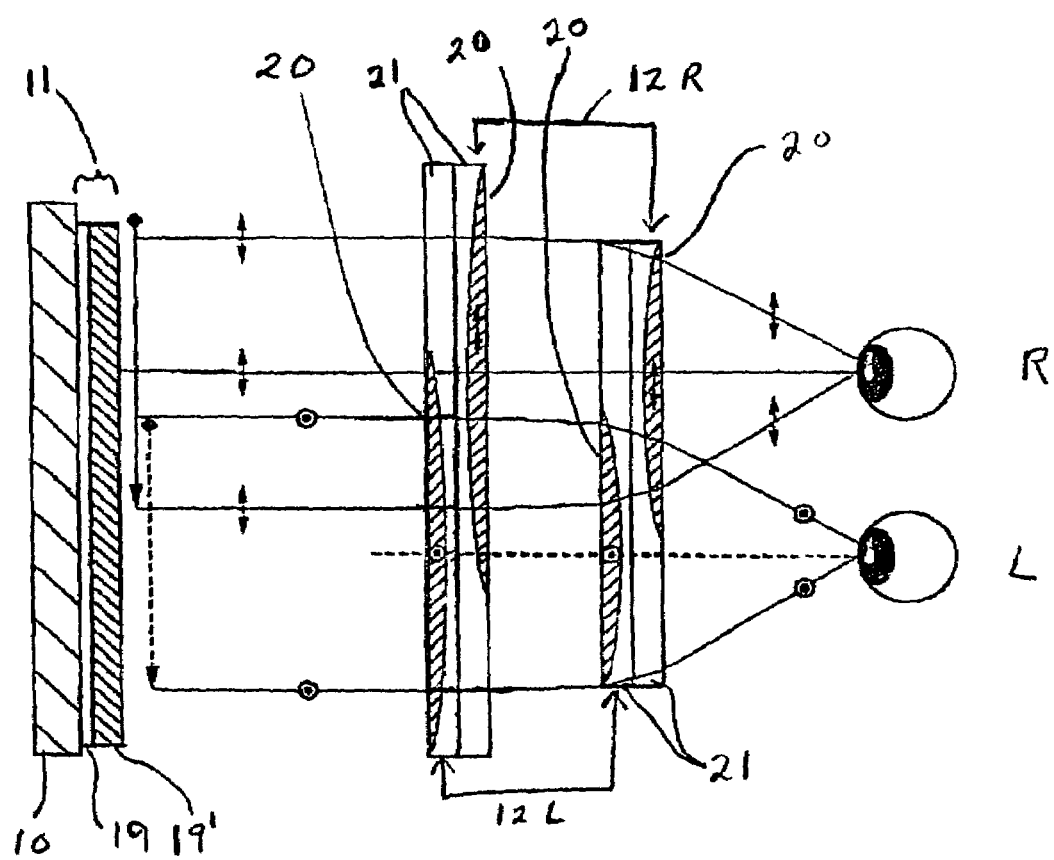
FIG. 8 shows the 3-D display device according to Embodiment 4.

FIG. 8 shows an entire 3-D display device according to Embodiment 4 of the present invention. This embodiment has the same basic configuration as that of Embodiment 1. Only the differences are hereinafter described.

Referring to FIG. 8, this embodiment includes a display panel 10, a polarization direction control element 11, a left optical path system 12L and a right optical path system 12R. The display panel combined with the polarization direction control element displays left and right images using polarized components which are orthogonal to each other, as indicated by the vertical arrows in the right optical path and the circled dot in the left optical path in the usual manner.

The display panel 10 uses a non-polarized luminescent panel with organic electro luminescent (EL) elements. This advantageously provides a device excellent in color reproduction and is inexpensive. The polarization direction control element 11 is a combination of a polarizing plate 19 and a polarization direction rotating element 19'. Light flux is linearly polarized by the polarizing plate and then rotated/not rotated by 90 degrees by the polarization direction rotating element (which may be formed of a twisted nematic liquid crystal element) synchronously with the display timing of the left and right images. Because the polarization direction is altered synchronously with the switching between the left and right images, the left and right images can be displayed using linearly polarized components which are orthogonal to each other. The polarization direction control element can be an element which is controllable to selectively transmit/block polarized components which are orthogonal to each other. For instance, it can be a single polarizing plate that is physically rotated in order to transmit/block polarized components which are orthogonal to each other.

The configuration of the optical display system is shown in FIG. 8. The left and right optical path systems 12L and 12R have a similar configuration except for their behavior in polarized light. Their optical elements each include two cemented doublets, each cemented doublet itself formed of a crystalline lens 20. The crystalline lens 20 is made of a birefringent material that is cemented within a concave space in a plate made of isotropic glass 21 (that is to say, regular glass). The doublets for the left and right optical paths may be cemented together, as illustrated, to thereby form only two spaced components, in a tandem arrangement. The crystalline lenses 20 are cemented into the concave regions of isotropic glass 21 as illustrated, each with its crystal axis orthogonal to the optical axis, and such that the crystal axes of the crystalline lenses 20 in the left versus the right optical paths are also orthogonal to each other.

Light flux polarized so as to be parallel with the crystal axis is subject to an imaging effect due to the difference in refractive indexes of the media, while light flux polarized orthogonally to the crystal axis is not subject to an imaging effect because there is no change in refractive index of the media. The left and right optical path systems are placed with their crystal axes orthogonal to each other, realizing an optical system having independent optical axes for polarization directions of light flux in the left and right optical paths.

For instance, the crystalline lens can be $YVO_4$ (yttrium vanadate), which has a refractive index No for the ordinary ray of 1.992 and a refractive index Ne for the extraordinary ray of 2.215. Isotropic glass having an index of refraction N equal to 1.99 can be used. Thus, the difference in refractive index of the media is approximately 0.2. A smaller focal length can be obtained for downsizing the optical elements by using two or more sets of cemented lenses in tandem.

For instance, when the eye relief is 50 mm, the field angle is 60 degrees, and the interpupillary distance is 55 mm, the left and right light fluxes are overlapped 5 mm. The left and right images are also overlapped on the display panel. A larger field angle and/or larger eye relief will result in larger overlapping of the display images. Thus, the present invention can solve the problems of physical interference between the left and right optical systems and displayed images even though the left and right light fluxes are overlapped.

The birefringent crystalline lens can be calcite, rutile crystal, or a combination of materials having equivalent refractive indexes.

EMBODIMENT 5

Figure 9:
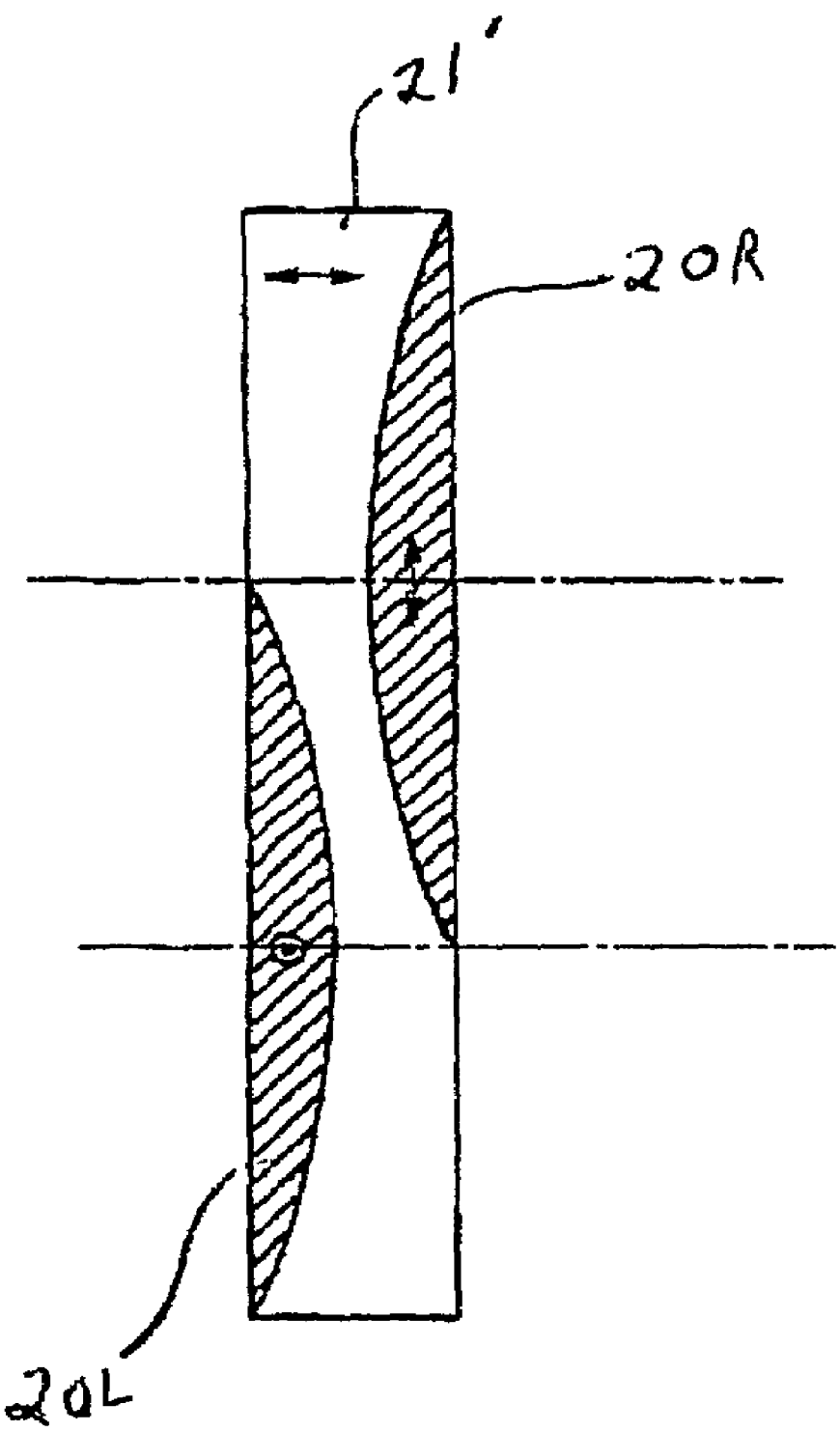
FIG. 9 shows the configuration of the lens components of a 3-D display device used in the left and right optical paths according to Embodiment 5.

FIG. 9 shows the configuration of the lens components of a display device used in the left and right optical paths according to Embodiment 5 of the present invention. The left and right optical path systems have a similar configuration except for their behavior to polarized light. This embodiment has the same basic configuration as Embodiment 4, including the tandem arrangement so as to achieve a shorter focal length. Only the differences are hereinafter described.

In this embodiment a triplet is used in place of the two cemented doublets of Embodiment 4. The triplet is formed entirely of birefringent crystalline material, as follows. A birefringent crystalline plate 21' has two birefringent crystalline lenses 20L, 20R inserted into concave regions formed in the birefringent crystalline plate 21', as illustrated. These concave regions are each offset laterally with respect to a center line of the crystalline plate 21'. The crystalline lenses 20L, 20R are cemented into the concave regions with their crystal axes orthogonal to each other and to the optical axis of the crystalline plate 21', which has its optical axis aligned parallel to the light path. In order to shorten the focal length of the display, a second birefringent plate that is similarly constructed is provided in tandem (not illustrated). Thus, two crystalline lenses 20 are provided in each of the left and right optical paths.

Light polarized parallel to the crystal axis is imaged due to the difference in the refractive indexes of the media, while light polarized orthogonal to the crystal axis is not imaged because there is no change in the refractive index of the media. Because the left and right optical path systems are placed with their crystal axes orthogonal to each other, the light in the left and right light paths are independent in the sense that interference between light in the two paths will not occur. In this embodiment, since the birefringent crystalline material can be the same material, appropriately arranged, selection of the material is facilitated.

EMBODIMENT 6

Figure 10:
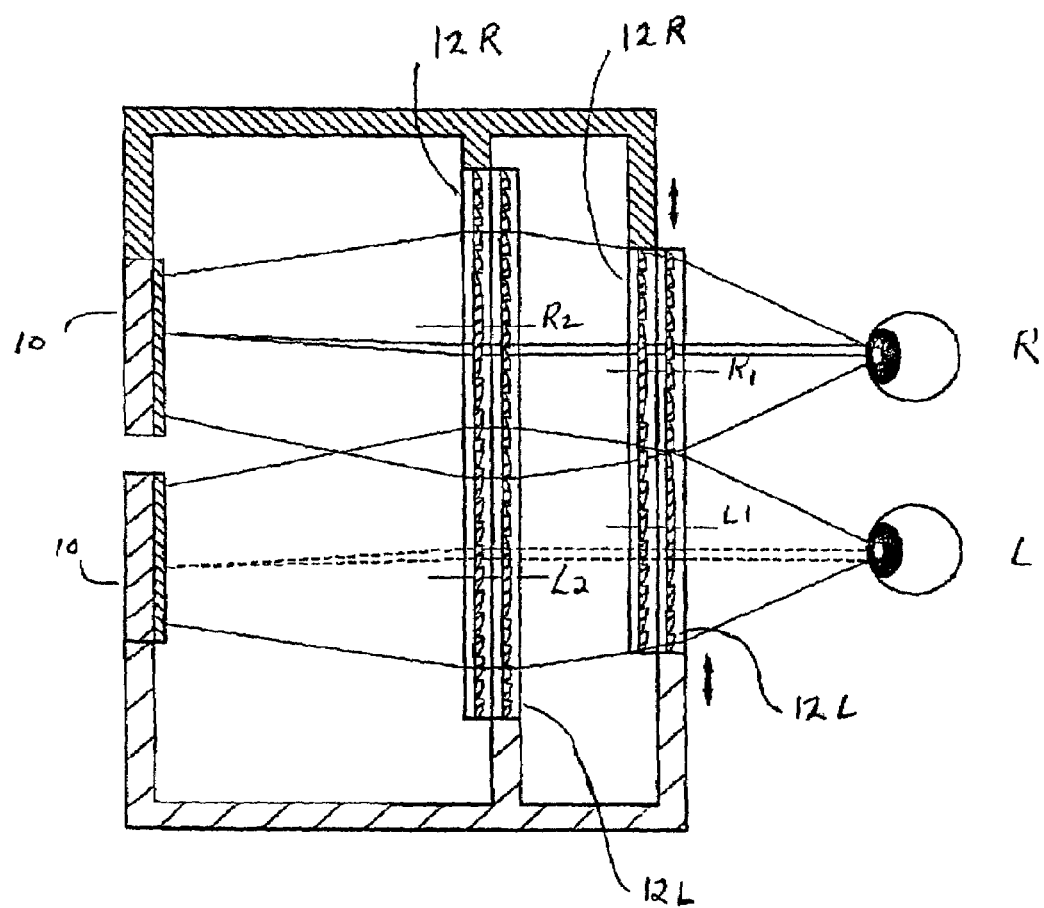
FIG. 10 shows the 3-D display device according to Embodiment 6.

FIG. 10 shows an entire 3-D display device according to Embodiment 6 of the present invention, including two display panels 10, 10 and optical systems for the left and right optical paths 12L and 12R. The left and right optical path systems have the same basic configuration as in Embodiment 3, and thus further explanation of these systems is omitted.

Figure 11:
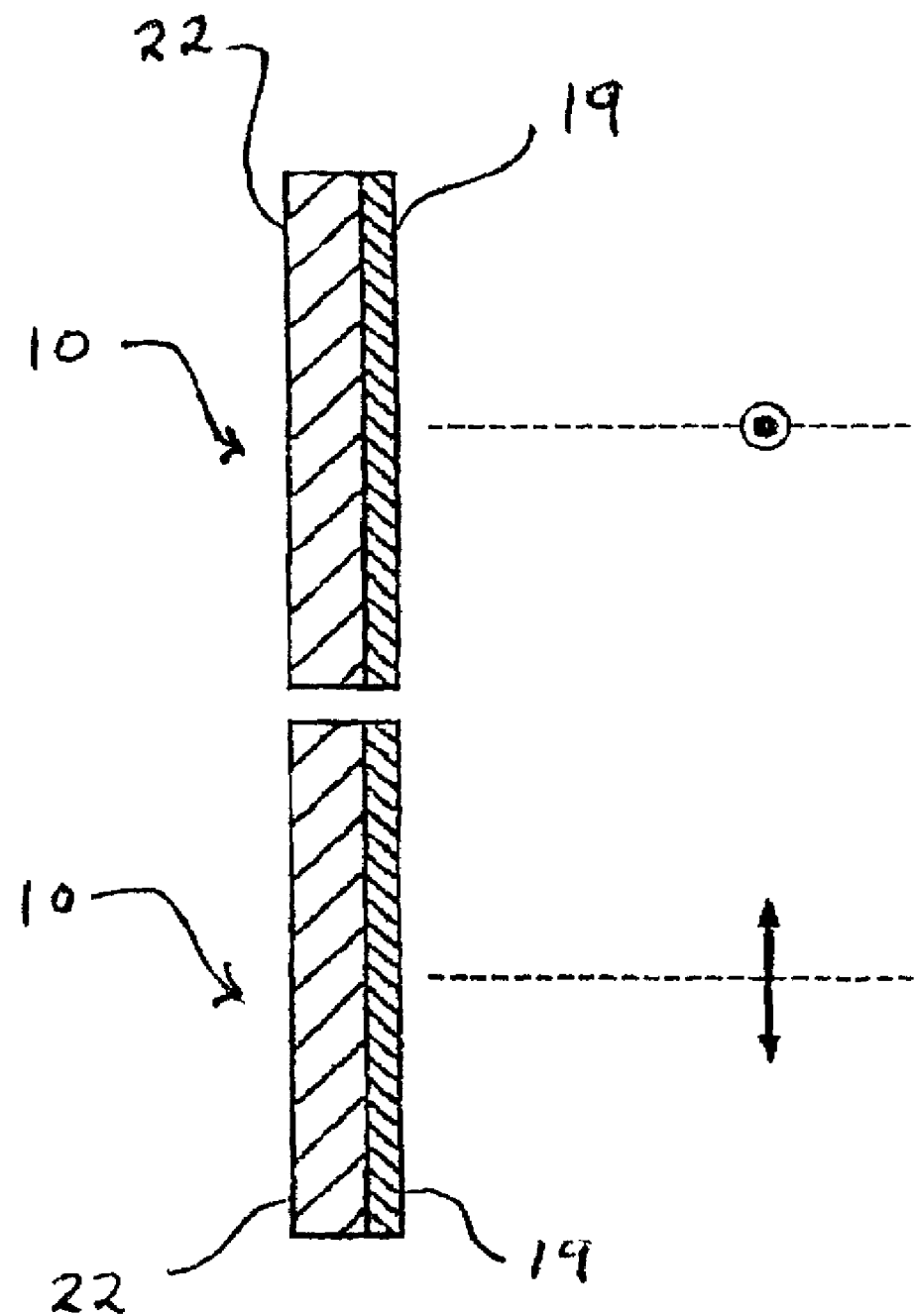
FIG. 11 shows the configuration of the display elements used in the 3-D display device of Embodiment 6.

FIG. 11 shows the configuration of the display elements used in the optical display panels of FIG. 10. In this embodiment, the left and right images are always displayed on the display panel. This is different from Embodiments 1 to 5, in which the left and right images are displayed alternately, in a time-division manner. Since the left and right images are always displayed, there is no flicker due to switching between left and right images. The display panel displays the left and right images using polarized components which are orthogonal to each other. As one example, linearly polarized components which are orthogonal to each other can be used for displaying the left and right images. Therefore, the polarization direction control and polarization direction rotating element as used in Embodiments 1 to 5 are not needed. In this embodiment a non-polarized, electro luminescent panel 22 with organic EL elements is used, and polarizing plates 19 provide the orthogonally polarized beams. However, other known means of achieving the same result may be used.

The left and right optical path systems 12L and 12R have off-centered optical axes. The left image is displayed on the display panel of the left optical path system and the right image is displayed on the display panel of the right optical path system. The left and right optical path systems have an imaging effect on the polarized components which are independent of each other due to the polarization direction of light in the two paths being orthogonal. Therefore, the left image is subject to the imaging effect of the left optical path system, and not the imaging effect of the right optical path system. Similarly, the right image is subject to the imaging effect of the right optical path system, not the imaging effect of the left optical path system. Since the left and right optical path systems have an imaging effect on the polarized components which are orthogonal to each other, independent optical axes can be realized even with the optical elements being arranged on the same optical path. In addition, the present embodiment off-sets the optical axes of the left and right images in two steps so that they are separately displayed on the left and right display panels. The optical elements nearer the viewer are off-set approximately the interpupillary distance. The optical elements nearer the display panels 10 are off-set to a larger extent so that left and right images that are formed are more separated. This can avoid physical interference between the left and right display panels. Because the left and right images are displayed on the individual display panels, there is no need for the polarization direction control element and synchronizing circuit which are required in Embodiment 1.

In this embodiment, the left and right optical paths can be overlapped so as to simultaneously achieve both a wide-angle of field of vision and a large eye relief. Further, aberrations at the left and right pupils can be independently corrected in the left and right optical path systems, thus facilitating correction and an optical system yielding high quality images.

As indicated by the vertical arrows in FIG. 10, Embodiment 6 includes an interpupillary distance control mechanism. As shown in FIG. 10, the display panel 10 and the left optical path system 12L are integrated within one frame. Similarly, the display panel 10 and the right optical path system 12R are integrated within another frame. Both frames are movable in the interpupillary distance direction so that the viewer can adjust the spacing between the left and right optical paths to coincide to his interpupillary distance. Mechanisms for changing the distance of the optical elements to be nearer the viewer, the distance of the optical elements to be nearer the display panel, and the distance from the viewer to the display panel can be independently added for easier observation.

EMBODIMENT 7

Figure 12:
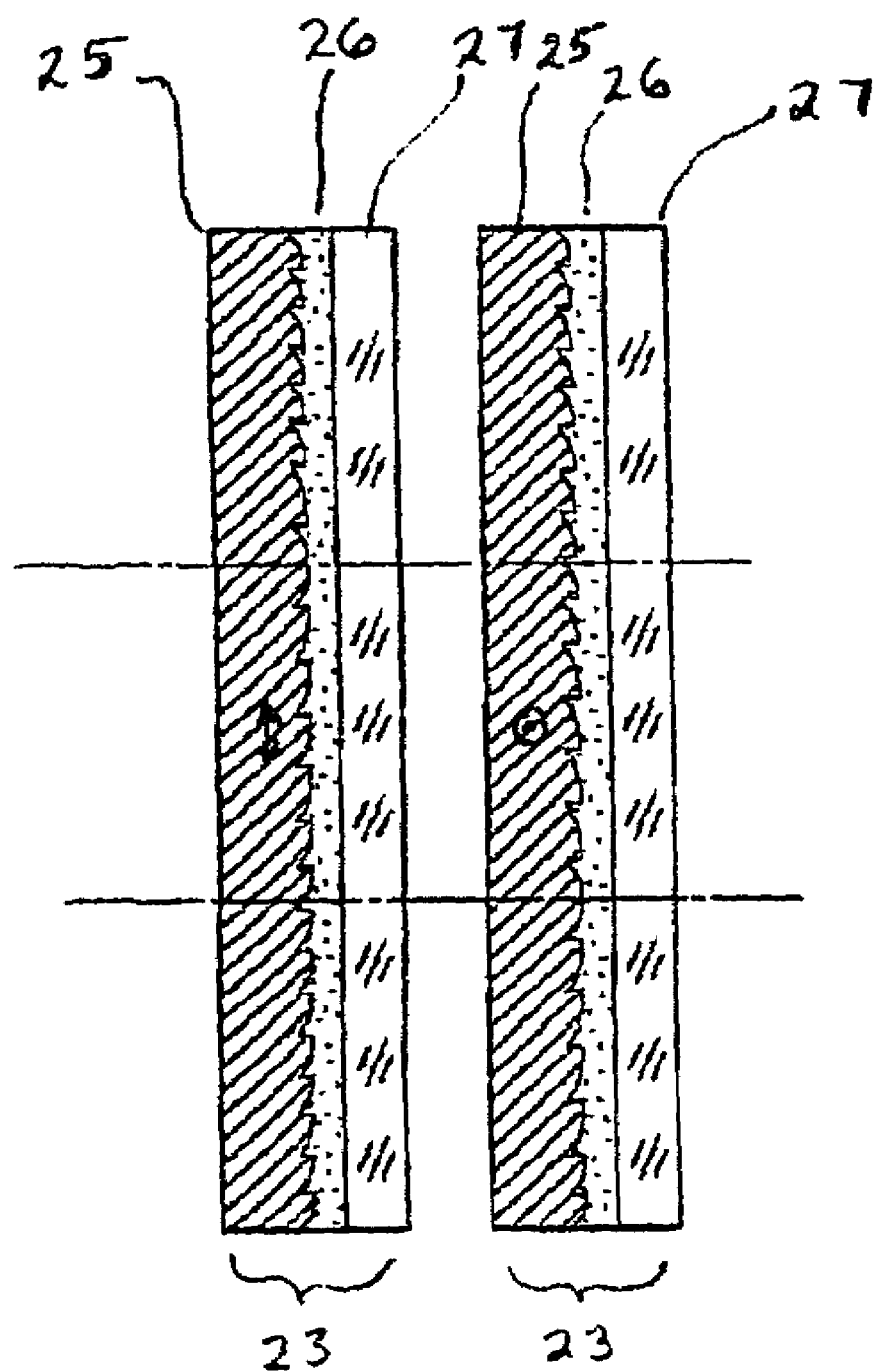
FIG. 12 shows the configuration of the optical elements used in the optical display device of Embodiment 7.
Figure 13:
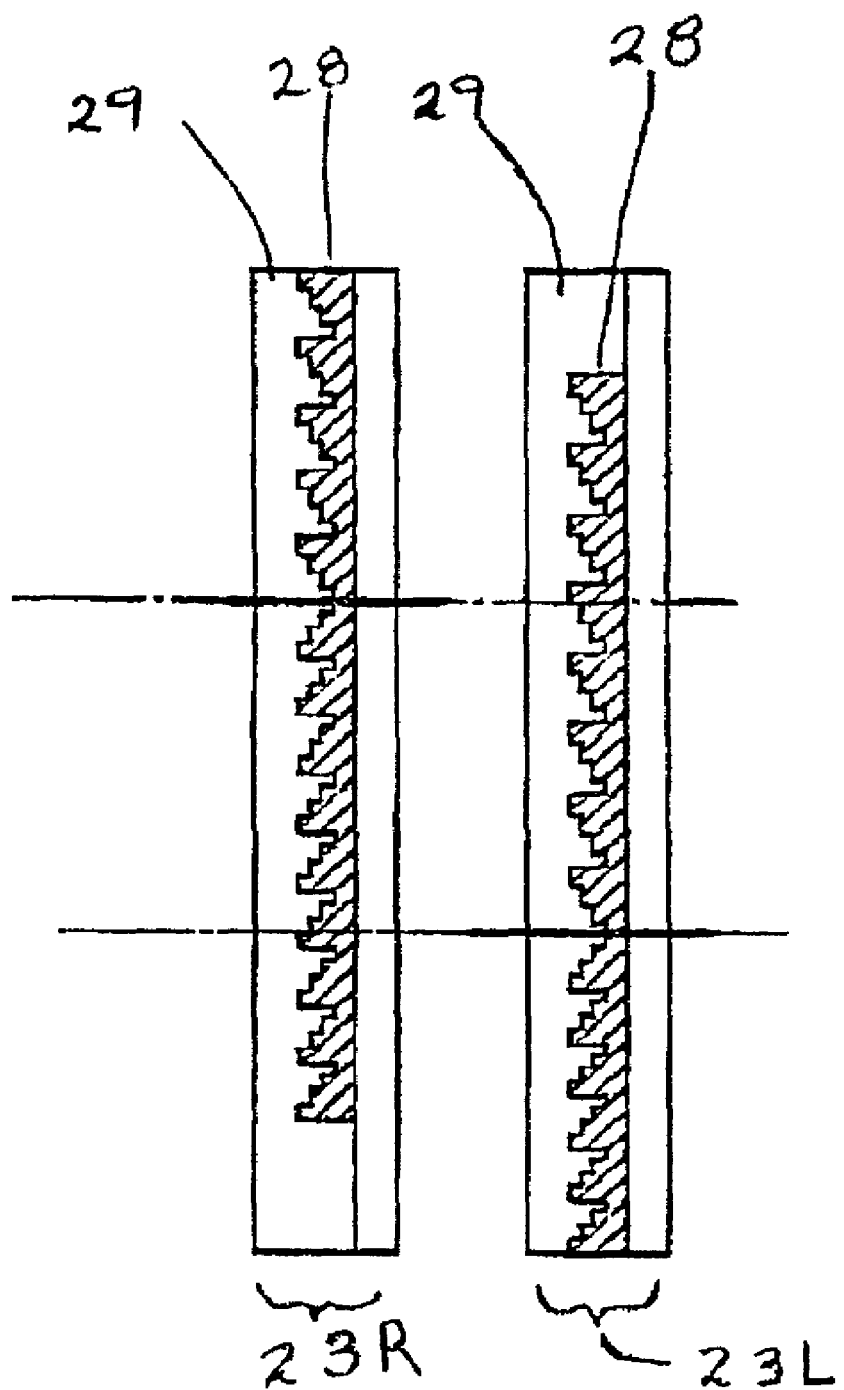
FIG. 13 shows an alternative configuration of the optical elements that may be used in the optical display device of Embodiment 7.

FIG. 12 shows an optical element that may be used in the optical display system of this embodiment. FIG. 13 shows an alternative optical element that may be used in the optical display system of this embodiment, and FIG. 14 shows the configuration of the 3-D display device of this embodiment.

This embodiment is a modified version of Embodiment 1. Only the components that differ are described hereinafter.

Figure 14:
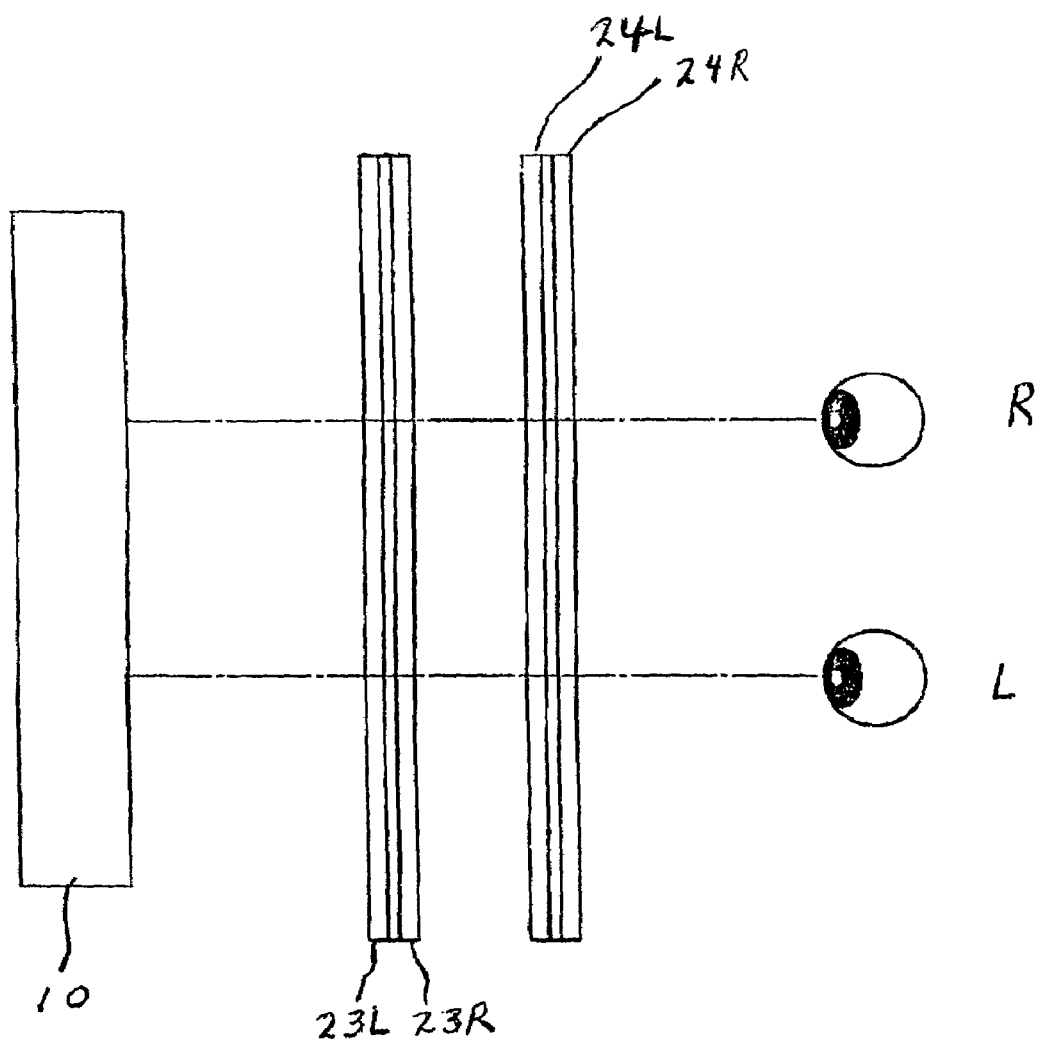
FIG. 14 shows the 3-D display device according to Embodiment 7.

As is shown in FIG. 14, DOE's 23L, 23R in tandem with Fresnel lenses 24L, 24R may be used in the light path in order to correct for chromatic aberrations. Each DOE 23L, 23R has the following construction. As shown in FIG. 12, two single axis crystals 25 are arranged in tandem along the optical axis, with their crystal axes as indicated (i.e., orthogonal to each other as well as orthogonal to the direction of the light path). Each single axis crystal has one surface that is planar. The other surface has a diffractive lens formed thereon, as is known in the art. An isotropic material 27 (FIG. 12) is cemented to the single axis crystal 25 using cementing material 26. Referring to FIG. 14, the left and right diffractive lenses of the DOE's 23L, 23R have crystal axes that are orthogonal to each other, as illustrated in FIG. 12, making the DOE's 23L, 23R work independently according to the polarization direction of polarized light. The negative dispersion of the DOE's enables improved correction of chromatic aberrations, as is known in the art.

FIG. 13 shows two birefringent DOE lenses 23R and 23L. Each birefringent DOE lens includes a birefringent substance 28 and the optical axes of each birefringent DOE lens 23R, 23L is decentered to the right and left, respectively, in the light path. Each birefringent DOE lens is made of isotropic glass 29, one surface of which is planar and the other surface of which has a Fresnel lens with diffractive microstructure (as is known in the art) formed in its surface by removing the isotropic glass so that a space is created between the isotropic glass and an adjoining substrate. A birefringent substance 28, such as birefringent liquid crystal or polymer 28, is added in the space formed by removing the isotropic glass before the adjoining substrate is bonded to the isotropic glass. FIG. 14 shows a display that uses birefringent DOE's 23L, 23R in tandem with birefringent Fresnel lenses 24L, 24R. The negative dispersion of the birefringent DOE's 23L, 23R provides for improved correction of chromatic aberrations.

EMBODIMENT 8

Figure 15:
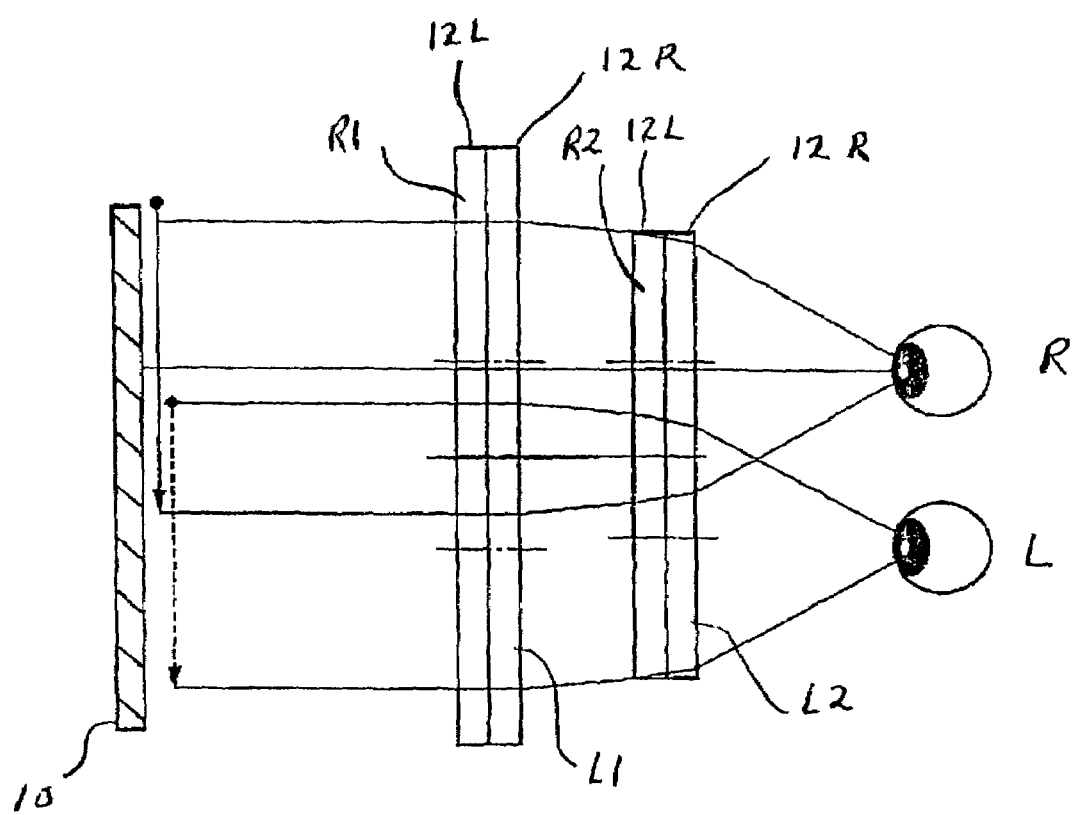
FIG. 15 shows the 3-D display device according to Embodiment 8.

FIG. 15 shows the 3-D display device according to Embodiment 8. U.S. Pat. No. 6,082,862 discloses electrically switchable holograms. Such a hologram can be rapidly switched for diffracting a light beam in selected directions, at will. In addition, the electrically switchable holograms can be placed in a tandem arrangement for controlling both imaging effects and prism effects in forming color images. The present embodiment uses such electrically switchable holograms. The left and right optical path systems 12L and 12R in this embodiment each include one or more such holograms. As before, the left and right images are displayed on the display panel 10 alternately, in a time-division manner as shown in FIGS. 5A, 5B. Since the hologram gives a different lens effect depending upon the wavelength of light, it is preferred that the display be illuminated by light having a narrow wavelength range. For this reason, a display panel that is reflective is preferred, so that the display panel can be illuminated alternately by narrow wavelength light sources of different wavelength ranges, such as provided by organic EL elements, plasma display elements, and light emitting devices.

The operation of this embodiment will now be described. FIG. 2 is a block diagram showing that image signals are switched by the switching device 13 alternately to display left and right images on the same display panel. The switching device is synchronized with the driving component for the reconfigurable optical element. Therefore, the electrically switchable holograms are driven synchronously with the switching between left and right images.

The left and right optical path systems 12L and 12R have optical axes that are parallel but each is off-centered with respect to the centerline of the display panel. The left images are displayed on the display panel on the optical axis of the left optical path system, and the right images are displayed on the display panel on the optical axis of the right optical path system. The left and right optical path systems effect imaging in a time-division manner. Therefore, the light in the left optical path is imaged by the left optical path system on the optical axis of the left optical path system and is not imaged by the right optical path system. Similarly, the light in the right optical path is imaged by the right optical path system on the optical axis of the right optical path system and is not imaged by the left optical path system.

Since the left and right optical path systems work alternately in a time-division manner, independent optical axes can be obtained using optical elements that are common to both optical paths. The left and right images are displayed on the same display device in a time-division manner. It is also possible to display left and right images such that the optical components overlap without physical interference between the left and right image display elements. Embodiment 8, which combines the optical systems and the display panels described above, enables the left and right optical paths to overlap, thereby simultaneously achieving both a wide field of view and a large eye relief. Aberrations at the left and right pupils are independently corrected in the left and right optical systems, facilitating favorably correction of aberrations and thus realizing an optical system yielding high quality images.

For instance, when the eye relief is 50 mm, field angle is 60 degrees, and the interpupillary distance is 55 mm, the left and right light fluxes overlap. The left and right images also overlap on the display panel. A larger field angle and/or larger eye relief result in a larger amount of overlap. The present invention can solve the problems of physical interference between the left and right optical systems and the left and right displayed images even though the left and right light fluxes overlap.

As for Embodiment 2 in FIG. 6, the interpupillary distance and vergence can be adjusted. Furthermore, as for Embodiment 6 in FIG. 10, a modified version with two display panels can be provided.

EMBODIMENT 9

Figure 16A:
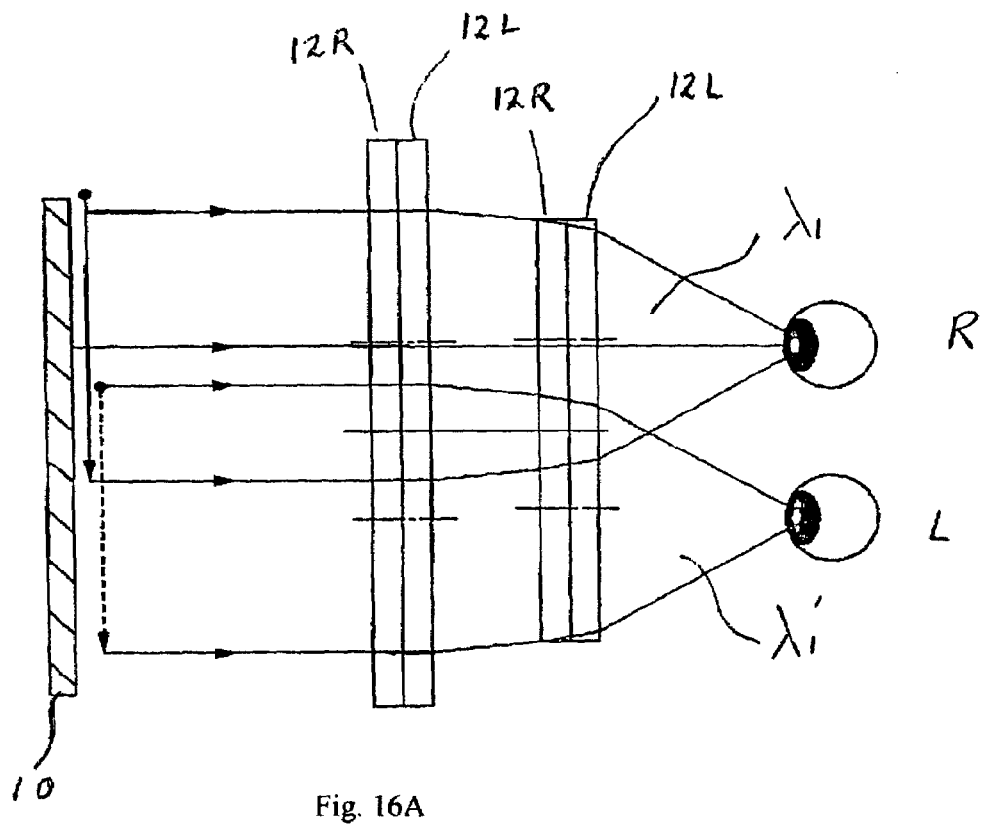
FIG. 16A shows the 3-D display device according to Embodiment 9.
Figure 16B:
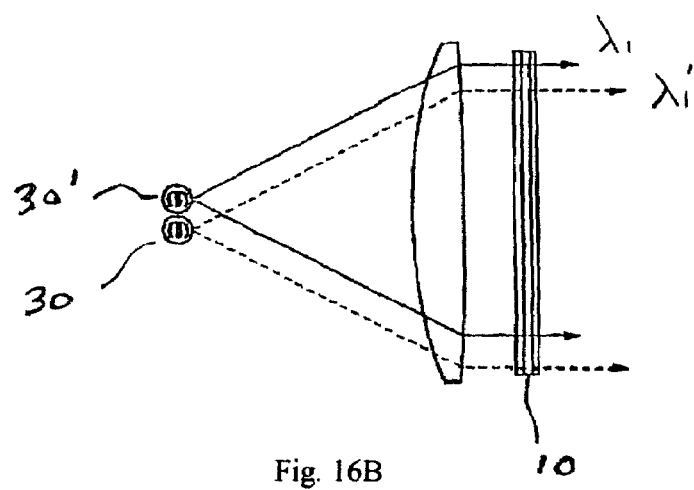
FIG. 16B shows two LED light sources that may be used to illuminate the display device of FIG. 16A.

The configuration of the display device of Embodiment 9 is shown in FIG. 16A, which includes a display panel 10, and left and right optical path systems 12L and 12R which are each formed of volume holograms. The present embodiment uses the high wavelength dependency of volume holograms in order to divide the light paths, thereby presenting only the left image to the left eye and the right image to the right eye. The left and right images are alternately displayed on the same display panel in a time-division manner, as shown in FIGS. 5A, 5B. The display panel 10 of this embodiment does not use polarized light, but instead uses display lights having different wavelength ranges that do not overlap. The image signals for the left and right images are switched alternately by a switching device so that the images are displayed on the display panel 10 in an alternate, time-division fashion. In synchronism with a left or right image being displayed on the display panel, a respective LED 30, 30' (FIG. 16B) is energized. The energized light emitting devices serve as illumination sources for the display panel. As shown in FIG. 16A, the left and right optical path systems have optical axes that are parallel but not colinear, and each is offset oppositely with respect to a centerline of the display panel 10. The left image is displayed on the display panel 10 on the optical axis of the left optical path system, and the right image is displayed on the display panel 10 on the optical axis of the right optical path system. Because the left and right optical path systems 12L, 12R effect imaging using light fluxes having different wavelength ranges, the left image is subject to an imaging effect by the volume hologram of the left path optical system, and not subject to the imaging effect of the volume hologram of the right optical path system, and vice-versa. In addition, instead of using a single volume hologram in each of the left and right optical path systems 12L, 12R, three volume holograms can be used in each optical path so as to produce left and right color images. For instance, the left optical path system could utilize illuminating LED's that emit light at wavelengths $\lambda_1$, $\lambda_2$, $\lambda_3$ and the right optical path system could utilize illuminating LED's that emit light at wavelengths $\lambda'_1$, $\lambda'_2$, $\lambda'_3$ so that each image appears as a full color, 3-D image.

Because the volume holograms in the left and right optical path systems are wavelength specific, independent optical axes can be obtained even though the volume holograms are placed on the same optical path. Thus, the left and right images can be displayed overlapping without physical interference between the left and right image display elements. Thus, the present embodiment enables both the left and right displayed images at the display panel to be overlapped as well as the left and right optical paths to be overlapped. In this manner, a wide field of view and a large eye relief are simultaneously obtainable. Aberrations at the left and right pupils are corrected independently in the left and right optical systems, facilitating favorable aberration correction and realizing an optical system that yields high quality images.

For instance, when the eye relief is 50 mm, the field angle is 60 degrees, and the interpupillary distance is 55 mm, the left and right light fluxes overlap 5 mm. The left and right images also overlap on the display panel. A larger field angle and/or larger eye relief can be achieved as a result of more overlapping. Thus, the present invention can solve the problem of physical interference between the left and right optical systems and the left and right displayed images even though the left and right light fluxes overlap.

As for Embodiment 2 in FIG. 6, the interpupillary distance and the distance between the centers of the left and right images on the display panel 10 can be adjusted. Furthermore, as for Embodiment 6 in FIG. 10, a modified version with two display panels can be provided, each including an organic EL element and a plasma display that provides illumination light at different wavelengths.

The present invention proposes a structure for reducing the distance between the displayed image and the viewer, and thus makes the display device smaller by providing an optical system having an optical axis that is shared by the left and right optical paths between the displayed image and the viewer.

Although the display device in Japanese Patent Publication No. 2000-267045 uses no optical system between the screen surface and the viewer, there is difficulty in ensuring good optical performance because the pupils in the optical projection system are decentered. Further, the display device disclosed in this patent is more complex due to the plural liquid crystal shutters that are required for switching the pupils.

EMBODIMENT 10

Figure 17:
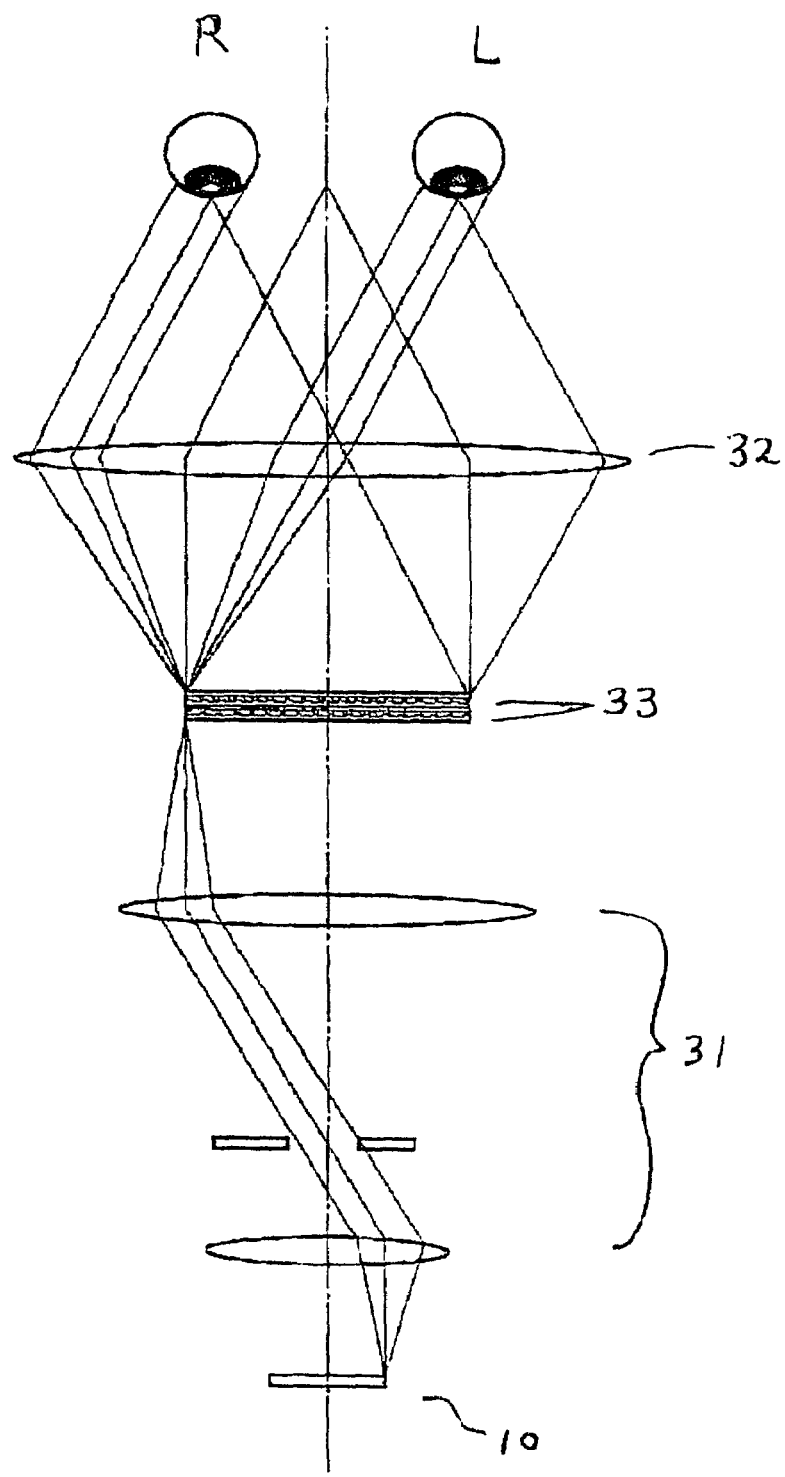
FIG. 17 shows the 3-D display device according to Embodiment 10.

FIG. 17 shows the 3-D display device according to Embodiment 10. In this embodiment, intermediate images of the image displayed on the display panel 10 are formed using an optical magnifying system 31. An optical viewing system 32 having an effective aperture that exceeds the interpupillary distance is interposed between the intermediate images and the viewer. Spaced pupils are used in order to switch the intermediate images to the intended viewing eye.

In this embodiment various display panels 10 can be used, so long as the display panel 10 displays left and right images having polarizations that are orthogonal to each other. For instance, a combination of a polarizing plate and a polarization direction rotating device can be used.

Birefringent DOE's 33 are positioned at the image plane to refract the two differently polarized light beams in different directions. Thus, a prism effect enables the left and right images to be directed to the left and right eyes, respectively. The optical viewing system 32 preferably is formed of a Fresnel lens having an aperture that exceeds the interpupillary distance and a focal length in the range of 40 to 200 mm so as to ensure that both eyes can see the displayed images and with sufficient eye relief for the viewing to be comfortable. The birefringent DOE's 33 direct the light to the left or right exit pupils depending on the polarization of the displayed image. The birefringent DOE's 33 are formed of birefringent material which is attached to a serrated surface. The difference in the polarization direction divides the optical path.

In the present embodiment, the separation angle from the previous image in the optical viewing system is +17 to −17 degrees when the viewing lens has a focal length of 100 mm. The left and right optical axes are separated approximately 60 mm according to the focal length of the viewing lens and the separation angle. Because the interpupillary distance is in the range of 55 to 65 mm for the vast majority of viewers, by using a pupil diameter larger than 5 mm, a display device is realized without need for any interpupillary adjustment by most viewers.

EMBODIMENT 11

Figure 18:
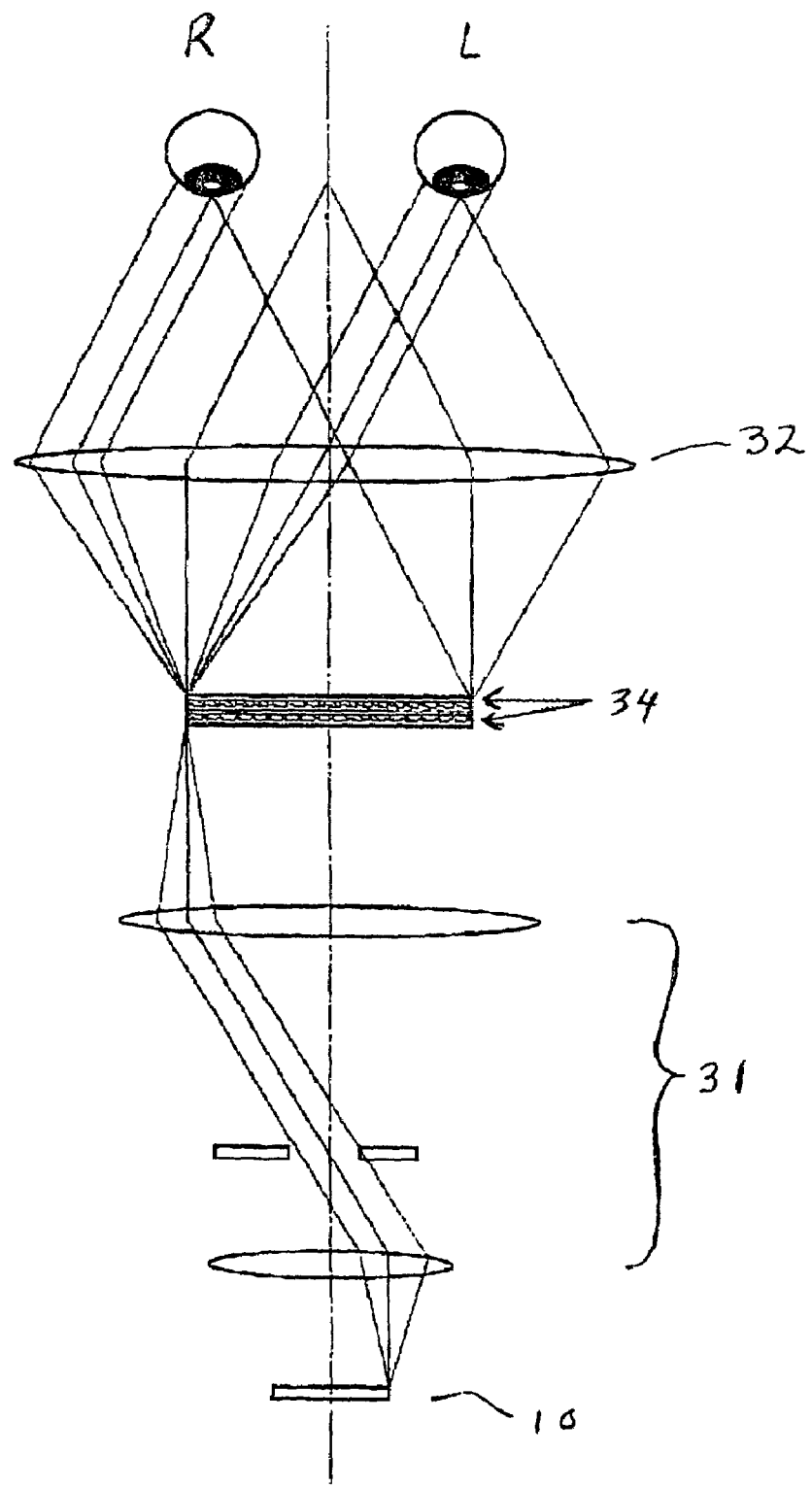
FIG. 18 shows the 3-D display device according to Embodiment 11.

FIG. 18 shows the 3-D display device according to Embodiment 11. In this embodiment, intermediate images of the images displayed on the display panel 10 are formed by an optical magnifying system. An optical viewing system 32 having an effective aperture that exceeds the interpupillary distance is interposed between the intermediate images and the viewer, Various display elements can be used, such as a monitor, liquid crystal display, plasma display, and so on. Spaced pupils are used for viewing the intermediate images by the left and right eyes. The intermediate images that are formed are switched to the spaced (left and right) pupils using reconfigurable holograms 34 positioned at the image plane of the intermediate images. These reconfigurable holograms are described in detail in U.S. Pat. No. 6,124,954.

The optical viewing system 32 (illustrated as a regular lens) preferably is a Fresnel lens. In order to provide images to both eyes and to ensure sufficient eye relief, this lens should have a focal length of 40 to 200 mm. As described above, at the image plane of the intermediate image are positioned reconfigurable holograms 34 so that the optical path can be divided into left and right beams in synchronism with the display of the left and right images, in alternating sequence, at the display panel 10. The reconfigurable holograms can be made to provide a polarization rotation and can be made in two layers so as to polarize and direct the light flux into the left and right eyes. Such a reconfigurable hologram is described in U.S. Pat. No. 6,101,008.

In the present embodiment, the separation angle from the previous image in the optical viewing system is +17 to −17 degrees when the viewing lens has a focal length of 100 mm. The left and right optical axes are separated approximately 60 mm due to the focal length of the viewing lens. Because the interpupillary distance is in the range 55 to 65 mm for the vast majority of viewers, by using a pupil diameter larger than 5 mm, a display device is realized without need for any interpupillary adjustment by most viewers.

EMBODIMENT 12

Figure 19:
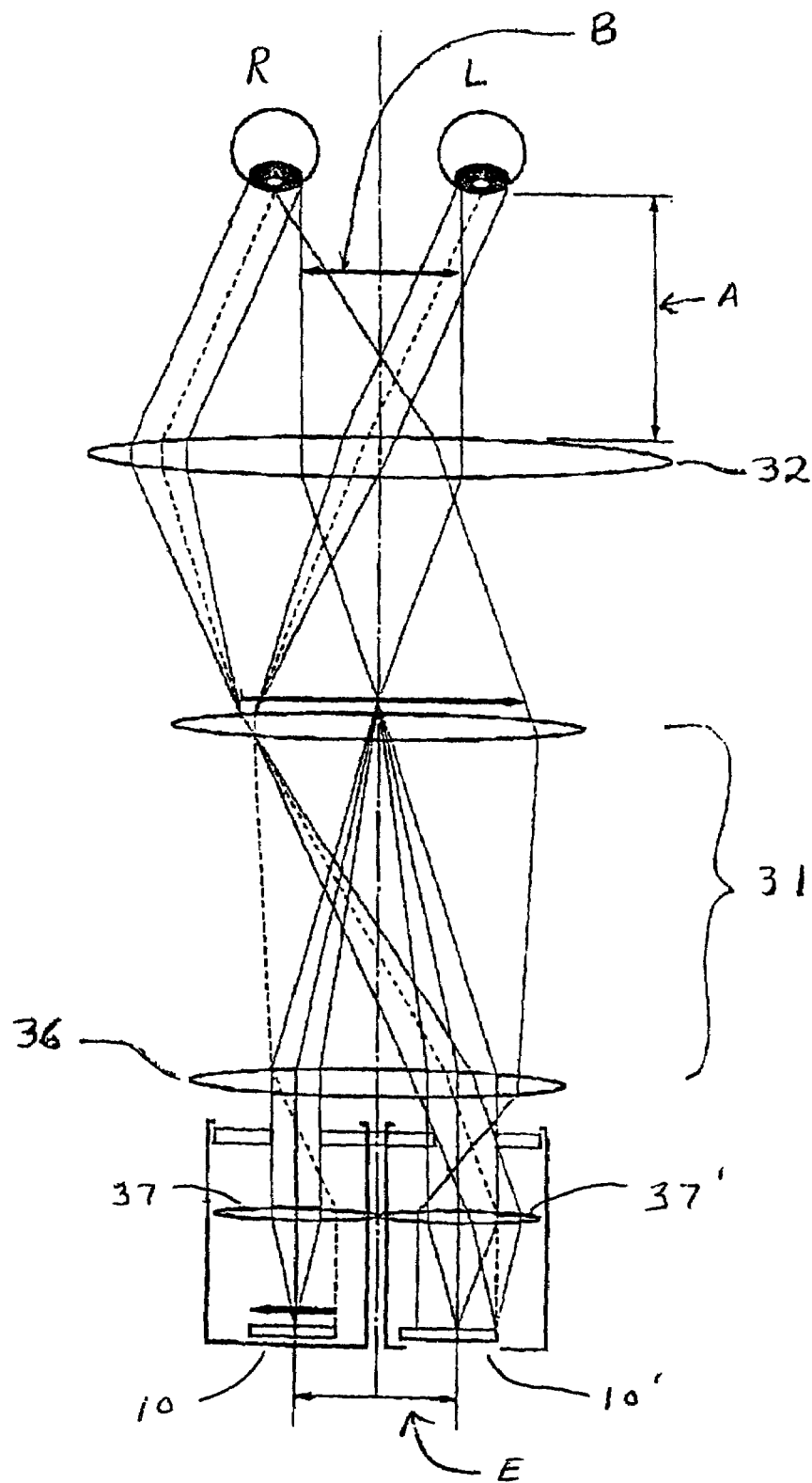
FIG. 19 shows the 3-D display device according to Embodiment 12.

FIG. 19 shows the 3-D display device according to Embodiment 12. In this embodiment, intermediate images of the images displayed on the display panels 10, 10' are formed by an optical magnifying system 31. To ensure sufficient eye relief, larger intermediate images are formed and a viewing lens having a larger focal length is used. An optical viewing system 32 having an effective aperture that exceeds the interpupillary distance is interposed between the intermediate image and the viewer. Depending upon the amount of decentering, spaced pupils are used for forming left and right images in the left and right eyes from the intermediate images. Various types of display panels 10, 10' can be used. In this embodiment each of the left and right images are displayed continuously. Thus, there is no need to switch between the left and the right images, and no flicker is present in the viewed images. The optical magnifying system 31 is placed in each light path following the left and right displayed images, and left and right apertures are placed before the optical magnifying system 31 in collimated beams formed by left and right collimating lenses 37, 37'. A pupil coupling lens 36 is used for focusing the left and right light collimated light fluxes at the same point. In this embodiment, the difference in the entrance pupil positions at the intermediate image causes the light to be divided into the left and right viewing paths.

The optical viewing system 32 may be a regular lens as shown, however, a Fresnel lens is preferred in order to reduce weight. In order to provide images to both eyes and to ensure sufficient eye relief, this lens should have a focal length greater than or equal to the eye relief, The eye relief is preferably in the range of 10 to 200 mm, which is appropriate for both comfortable observation and a reasonably compact display device. In this embodiment, both the focal length of the viewing lens and the eye relief are 40 mm, and the magnitude of off-set of the left and right optical axes is determined by the focal length of the viewing lens and the angle between the left and right optical paths.

The interpupillary distance is usually in the range of 55 to 65 mm. In this embodiment, the distance between the left and right optical axes is 60 mm. Because the interpupillary distance is in the range of 55 to 65 mm for the vast majority of viewers, by using a pupil diameter larger than 5 mm, a display device is realized without need for any interpupillary adjustment by most viewers. This embodiment satisfies the below Conditions 1–3:

$A \leq F$        Condition 1

$B/F = E/C$        Condition 2

$H = C/D$        Condition 3 where
- A is the eye relief, which is 40 mm;
- B is the interpupillary distance, which is 60 mm;
- C is the focal length of the pupil coupling lens, which is 40 mm;
- D is the focal length of the image projection lens, which is 10 mm;
- E is the distance between the optical axes of the left and right image projection lens, which is 60 mm;
- F is the focal length of the viewing lens, which is 40 mm; and
- H is the projection magnification at the middle coupling point of the display element, which is 4×.

The intermediate image has a maximum image height of 50 mm when the visual field is 60 degrees. The maximum image size on the imaging element is approximately 12.5 mm. The distance between the left and right optical axes of the collimated light beams containing the projected images is variable so that the interpupillary distance is adjustable.

The invention being thus described, it will be obvious that the same may be varied in many ways. For example, rather than using orthogonal, linearly polarized light where different polarized components are used to keep two beams independent of each other, in the sense that interference effects will not arise, right and left circularly polarized beams may instead be used, as is known in the art. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. A 3-D display device comprising:
   a display means that displays left and right images at respective left and right positions on a display panel, the left and right images being partially overlapped on the display panel; and
   an optical magnifying system having left and right optical viewing systems with respective optical axes that are aligned substantially parallel with one another, the left optical viewing system having an exit pupil and an effective aperture that includes the optical axis of the right optical viewing system, and the right optical viewing system having an exit pupil and an effective aperture that includes the optical axis of the left optical viewing system;
   wherein:
   of the left and right images displayed on the display panel, only the left images are viewable at the left exit pupil and only the right images are viewable at the right exit pupil;
   the display means displays the left and right images alternately on the display panel in a time-multiplexed manner; and
   the displaying of the left and right images is synchronized with a switching operation between the left and right optical viewing systems so that the right optical viewing system forms only right images and the left optical viewing system forms only left images.

2. A 3-D display device comprising:
   a display means that displays left and right images at respective left and right positions on a display panel, the left and right images being partially overlapped on the display panel; and
   an optical magnifying system having left and right optical viewing systems with respective optical axes that are aligned substantially parallel with one another, the left optical viewing system having an exit pupil and an effective aperture that includes the optical axis of the right optical viewing system, and the right optical viewing system having an exit pupil and an effective aperture that includes the optical axis of the left optical viewing system;
   wherein:
   of the left and right images displayed on the display panel, only the left images are viewable at the left exit pupil and only the right images are viewable at the right exit pupil;
   the left and right images have polarizations which are independent of each other;
   the left and right optical viewing systems of the optical magnifying system have polarizations which are independent of each other;
   the polarization of the right image is the same as the polarization of the right viewing system, and the polarization of the left image is the same as the polarization of the left viewing system.

3. A 3-D display device comprising:

a display means that displays left and right images at respective left and right positions on a display panel, the left and right images being partially overlapped on the display panel;

an optical magnifying system having left and right optical viewing systems with respective optical axes that are separate and aligned substantially parallel with one another, the left optical viewing system having an exit pupil and an effective aperture that includes the optical axis of the right optical viewing system, and the right optical viewing system having an exit pupil and an effective aperture that includes the optical axis of the left optical viewing system;

wherein, of the left and right images displayed on the display panel, only the left images are viewable at the left exit pupil and only the right images are viewable at the right exit pupil.

4. The 3-D display device according to claim 1, wherein:

the display means displays the left and right images using different wavelengths of light which do not overlap; and the optical magnifying system includes optical elements which operate on a light beam or do not operate on a light beam depending on the wavelength of the light beam, such that the left optical viewing system forms left images and does not form right images, and the right optical viewing system forms right images and does not form left images.

5. The 3-D display device according to claim 1, wherein:

the distance between the exit pupils is adjustable by changing the distance between the left and right viewing systems, which changes the distance between the left and right displayed images.

6. The 3-D display device according to claim 1, wherein:

one of the distance between the left and right displayed images and the distance between the left and right viewing systems is separately adjustable.

7. The 3-D display device according to claim 1, wherein:

the left and right images on the display panel are displayed alternately, in a time-multiplexed manner;

the left and right images have polarizations which are independent of each other; and the left optical viewing system passes the polarization of the left image and does not pass the polarization of the right image, and the right optical viewing system passes the polarization of the right image and does not pass the polarization of the left image.

8. The 3-D display device according to claim 1 wherein:

the left and right images on the display panel are displayed alternately in a time-division manner;

the left and right optical systems have optical axes which are de-centered with respect to a centerline of the display panel; and a reconfigurable holographic optical element is provided which is turned on/off in a time-division manner in synchronism with the display of left and right images.

9. The 3-D display device according to claim 1 wherein:

the display means displays the left and right images using different wavelengths of light which do not overlap;

the left and right optical systems have optical axes which are substantially parallel and a thick holographic optical element is provided such that the left optical viewing system forms left images and does not form right images, and the right optical viewing system forms right images and does not form left images.

10. A 3-D display device comprising:

a display means that displays left and right images at respective left and right display panels, the left and right images having polarizations that are independent of one another;

an optical magnifying system having left and right optical viewing systems with respective optical axes that are aligned substantially parallel with one another, the left optical viewing system having an exit pupil and an effective aperture that includes the optical axis of the right optical viewing system, and the right optical viewing system having an exit pupil and an effective aperture that includes the optical axis of the left optical viewing system;

wherein, the left and right optical systems have respective left and right optical axes for different polarizations of light which are independent of each other such that, of the left and right images displayed on the display panels, only the left images are viewable at the left exit pupil and only the right images are viewable at the right exit pupil.

11. A 3-D display device comprising:

a display means that includes a display panel, said display means displaying left and right images on the display panel in positions that are shifted to the left and right, respectively; and an optical magnifying system which includes left and right optical viewing systems, the left and right optical viewing systems having separate optical axes, the left optical viewing system having an effective aperture that includes the optical axis of the right optical viewing system, and the right optical viewing system having an effective aperture that includes the optical axis of the left optical viewing system;

wherein the left and right optical viewing systems convey light having different polarizations, different wavelengths, or different time-division periods such that the left optical viewing system forms only left images and the right optical viewing system forms only right images, the left image and the left optical viewing system share a first common polarization, wavelength, or time-division period, and the right image and the right optical viewing system share a different polarization, wavelength, or time-division period.

12. A viewing device for viewing 3-D images which comprises:

a display means which displays left and right images alternately on a display panel;

an optical magnifying system which provides images to left and right exit pupils of the viewing device; and at least two holographic optical elements having different optical axes, each holographic optical element having an effective aperture that includes the optical axis of the other holographic optical element.

13. A 3-D display device comprising:

a display means which includes display panels, the display means displaying, in a time-division manner, left and right images having polarized components which are independent of one another;

an optical magnifying system that forms intermediate images of the images displayed by the display means;

a birefringent, diffractive optical element located at the position of the intermediate images; and a viewing optical system having left and right optical paths and an effective aperture that exceeds the interpupillary distance of a viewer, with the viewing optical system positioned between the intermediate image and the viewer;

wherein the left and right optical paths are switched, at the position of the intermediate images according to the polarization of the light forming the intermediate images, to respective left and right exit pupils of the viewing optical system.

14. A 3-D display device comprising:

a display means which includes display panels, the display means displaying, in a time-division manner, left and right images having polarized components which are independent of one another;

an optical magnifying system which forms intermediate images of the images displayed by the display means;

a reconfigurable holographic optical element, positioned at the location of the intermediate images, the polarization of the holographic optical element being switchable in a time-division manner so as to be synchronized with the display of left and right images; and a viewing system, positioned between the intermediate images and a viewer, and having an effective aperture that exceeds the interpupillary distance of the viewer;

wherein left and right images are formed at respective left and right exit pupils, said left and right images being images of the intermediate images according to the switching of the reconfigurable holographic optical element in a time-division manner.

15. A 3-D display device comprising:

a display means that includes display panels, said display means displaying left and right images on the display panels;

an optical system positioned in each light path following the displayed left and right images which forms collimated left and right light beams;

left and right apertures, respectively, positioned in the collimated left and right light beams;

an imaging lens for focusing the collimated left and right light beams onto the same position; and an optical magnifying system that forms intermediate images of the displayed left and right images;

wherein the light at the intermediate images is divided into left and right light paths by a difference in the positions of the entrance pupils of the light forming the intermediate images; and a viewing system that forms images of the intermediate images at respective left and right exit pupils, the viewing system having an effective aperture that exceeds the distance between the left and right exit pupils.

16. The 3-D display device according to claim 15 wherein the distance between the left and right exit pupils may be changed by changing the distance between said collimated left and right beams so as to adjust the distance between the left and right exit pupils to the interpupillary distance of a viewer.

17. A 3-D display device comprising:

a display which includes a display panel on which left and right images are displayed at respective left and right positions, the left and right images being partially overlapped on the display panel;

an optical magnifying system having left and right optical viewing systems with respective optical axes that are separate and aligned substantially parallel with one another, the left optical viewing system having an exit pupil and an effective aperture that includes the optical axis of the right optical viewing system, and the right optical viewing system having an exit pupil and an effective aperture that includes the optical axis of the left optical viewing system;

wherein, of the left and right images displayed on the display panel, only the left images are viewable at the left exit pupil and only the right images are viewable at the right exit pupil.

18. The 3-D display device according to claim 17, wherein:

the display displays the left and right images using different wavelengths of light which do not overlap; and the optical magnifying system includes optical elements which operate on a light beam or do not operate on a light beam depending on the wavelength of the light beam, such that the left optical viewing system forms left images and does not form right images, and the right optical viewing system forms right images and does not form left images.

19. The 3-D display device according to claim 17, wherein:

the distance between the exit pupils is adjustable by changing the distance between the left and right viewing systems, which changes the distance between the left and right displayed images.

20. The 3-D display device according to claim 17, wherein:

one of the distance between the left and right displayed images and the distance between the left and right viewing systems is separately adjustable.

21. The 3-D display device according to claim 17, wherein:

the left and right images on the display panel are displayed alternately, in a time-multiplexed manner;

the left and right images have polarizations which are independent of each other; and the left optical viewing system passes the polarization of the left image and does not pass the polarization of the right image, and the right optical viewing system passes the polarization of the right image and does not pass the polarization of the left image.

22. The 3-D display device according to claim 17 wherein:

the left and right images on the display panel are displayed alternately in a time-division manner;

the left and right optical systems have optical axes which are de-centered with respect to a centerline of the display panel; and a reconfigurable holographic optical element is provided which is turned on/off in a time-division manner in synchronism with the display of left and right images.

23. The 3-D display device according to claim 17 wherein:

the display displays the left and right images using different wavelengths of light which do not overlap;

the left and right optical systems have optical axes which are substantially parallel and a thick holographic optical element is provided such that the left optical viewing system forms left images and does not form right images, and the right optical viewing system forms right images and does not form left images.

24. A 3-D display device comprising:

a display which includes a display panel on which left and right images are displayed at respective left and right positions on a display panel, the left and right images being partially overlapped on the display panel;

an optical magnifying system having left and right optical viewing systems with respective optical axes that are separate and aligned substantially parallel with one another, the left optical viewing system having an exit pupil and an effective aperture that includes the optical axis of the right optical viewing system, and the right optical viewing system having an exit pupil and an effective aperture that includes the optical axis of the left optical viewing system;

wherein of the left and right images displayed on the display panel, only the left images are viewable at the left exit pupil and only the right images are viewable at the right exit pupil;

the left and right images have polarizations which are independent of each other;

the left and right optical viewing systems of the optical magnifying system have polarizations which are independent of each other; and the polarization of the right image is the same as the polarization of the right viewing system, and the polarization of the left image is the same as the polarization of the left viewing system.

25. A 3-D display device comprising:

a display which includes a display panel on which left and right images are displayed at respective left and right positions on a display panel, the left and right images being partially overlapped on the display panel;

an optical magnifying system having left and right optical viewing systems with respective optical axes that are separate and aligned substantially parallel with one another, the left optical viewing system having an exit pupil and an effective aperture that includes the optical axis of the right optical viewing system, and the right optical viewing system having an exit pupil and an effective aperture that includes the optical axis of the left optical viewing system;

wherein, of the left and right images displayed on the display panel, only the left images are viewable at the left exit pupil and only the right images are viewable at the right exit pupil;

the display displays the left and right images alternately on the display panel in a time-multiplexed manner; and the displaying of the left and right images is synchronized with a switching operation between the left and right optical viewing systems so that the right optical viewing system forms only right images and the left optical viewing system forms only left images.

26. A 3-D display device comprising:

a display which includes left and right display panels and that displays left and right images at the respective left and right display panels, the left and right images having polarizations that are independent of one another;

an optical magnifying system having left and right optical viewing systems with respective optical axes that are aligned substantially parallel with one another, the left optical viewing system having an exit pupil and an effective aperture that includes the optical axis of the right optical viewing system, and the right optical viewing system having an exit pupil and an effective aperture that includes the optical axis of the left optical viewing system;

wherein, the left and right optical systems have respective left and right optical axes for different polarizations of light which are independent of each other such that, of the left and right images displayed on the display panels, only the left images are viewable at the left exit pupil and only the right images are viewable at the right exit pupil.

27. A 3-D display device comprising:

a display that includes a display panel, said display displaying left and right images on the display panel in positions that are shifted to the left and right, respectively; and an optical magnifying system which includes left and right optical viewing systems, the left and right optical viewing systems having separate optical axes, the left optical viewing system having an effective aperture that includes the optical axis of the right optical viewing system, and the right optical viewing system having an effective aperture that includes the optical axis of the left optical viewing system;

wherein the left and right optical viewing systems convey light having different polarizations, different wavelengths, or different time-division periods such that the left optical viewing system forms only left images and the right optical viewing system forms only right images, the left image and the left optical viewing system share a first common polarization, wavelength, or time-division period, and the right image and the right optical viewing system share a different polarization, wavelength, or time-division period.

28. A viewing device for viewing 3-D images which comprises:

a display which includes a display panel on which left and right images are alternately displayed;

an optical magnifying system which provides images to left and right exit pupils of the viewing device; and at least two holographic optical elements having different optical axes, each holographic optical element having an effective aperture that includes the optical axis of the other holographic optical element.

29. A 3-D display device comprising:

a display which includes display panels on which are displayed, in a time-division manner, left and right images having polarized components which are independent of one another;

an optical magnifying system that forms intermediate images of the images displayed by the display;

a birefringent, diffractive optical element located at the position of the intermediate images; and a viewing optical system having left and right optical paths and an effective aperture that exceeds the interpupillary distance of a viewer, with the viewing optical system positioned between the intermediate image and the viewer;

wherein the left and right optical paths are switched, at the position of the intermediate images according to the polarization of the light forming the intermediate images, to respective left and right exit pupils of the viewing optical system.

30. A 3-D display device comprising:

a display which includes display panels on which are displayed, in a time-division manner, left and right images having polarized components which are independent of one another;

an optical magnifying system which forms intermediate images of the images displayed by the display;

a reconfigurable holographic optical element, positioned at the location of the intermediate images, the polarization of the holographic optical element being switchable in a time-division manner so as to be synchronized with the display of left and right images; and a viewing system, positioned between the intermediate images and a viewer, and having an effective aperture that exceeds the interpupillary distance of the viewer;

wherein left and right images are formed at respective left and right exit pupils, said left and right images being images of the intermediate images according to the switching of the reconfigurable holographic optical element in a time-division manner.

31. A 3-D display device comprising:

a display that includes display panels on which are displayed left and right images;

an optical system positioned in each light path following the displayed left and right images which forms collimated left and right light beams;

left and right apertures, respectively, positioned in the collimated left and right light beams;

an imaging lens for focusing the collimated left and right light beams onto the same position; and an optical magnifying system that forms intermediate images of the displayed left and right images;

wherein the light at the intermediate images is divided into left and right light paths by a difference in the positions of the entrance pupils of the light forming the intermediate images; and a viewing system that forms images of the intermediate images at respective left and right exit pupils, the viewing system having an effective aperture that exceeds the distance between the left and right exit pupils.

32. The 3-D display device according to claim 31 wherein the distance between the left and right exit pupils may be changed by changing the distance between said collimated left and right beams so as to adjust the distance between the left and right exit pupils to the interpupillary distance of a viewer.

* * * * *